United States Patent
Bharrat et al.

(10) Patent No.: US 10,397,316 B2
(45) Date of Patent: Aug. 27, 2019

(54) METHODS AND APPARATUS FOR LOAD BALANCING IN SDN NETWORKS

(71) Applicant: Ribbon Communications Operating Company, Inc.

(72) Inventors: Shaun Jaikarran Bharrat, Manalapan, NJ (US); Tolga Asveren, Bordentown, NJ (US); Justin Hart, Purton (GB)

(73) Assignee: Ribbon Communications Operating Company, Inc., Westford, MA (US)

( * ) Notice: Subject to any disclaimer, the term of this patent is extended or adjusted under 35 U.S.C. 154(b) by 0 days.

(21) Appl. No.: 15/821,475

(22) Filed: Nov. 22, 2017

(65) Prior Publication Data

US 2018/0077229 A1    Mar. 15, 2018

Related U.S. Application Data

(63) Continuation-in-part of application No. 15/168,841, filed on May 31, 2016.

(60) Provisional application No. 62/507,171, filed on May 16, 2017.

(51) Int. Cl.
*H04L 12/28* (2006.01)
*H04L 29/08* (2006.01)
*H04L 29/06* (2006.01)

(52) U.S. Cl.
CPC ...... *H04L 67/1027* (2013.01); *H04L 65/1006* (2013.01); *H04L 65/1069* (2013.01)

(58) Field of Classification Search
CPC ........................................................ H04L 12/50
USPC ............................................................. 370/329
See application file for complete search history.

(56) References Cited

U.S. PATENT DOCUMENTS

2018/0323901 A1*  11/2018  Seok .................... H04L 1/1671

* cited by examiner

*Primary Examiner* — Dang T Ton
(74) *Attorney, Agent, or Firm* — Straub & Straub; Stephen T. Straub; Michael P. Straub

(57) ABSTRACT

Methods and apparatus for providing load balancing in a Software Defined Network (SDN). An exemplary embodiment includes the steps of: receiving by a Session Border Controller (SBC) cluster leader a first SIP invite message including a source IP address, assigning responsibility for processing the received message to a first SBC in a cluster of SBCs, and initiating by the first SBC installation of a first flow table entry into SDN switches used to control packet routing in an SDN network, the first flow table entry controlling SDN switches into which the first flow table entry is installed to replace a destination IP address in received packets which satisfy matching criteria of the first flow table entry with a first SBC IP ingress address of the first SBC and to route received packets matching the criteria of the first flow table entry based on the first SBC IP ingress address.

20 Claims, 16 Drawing Sheets

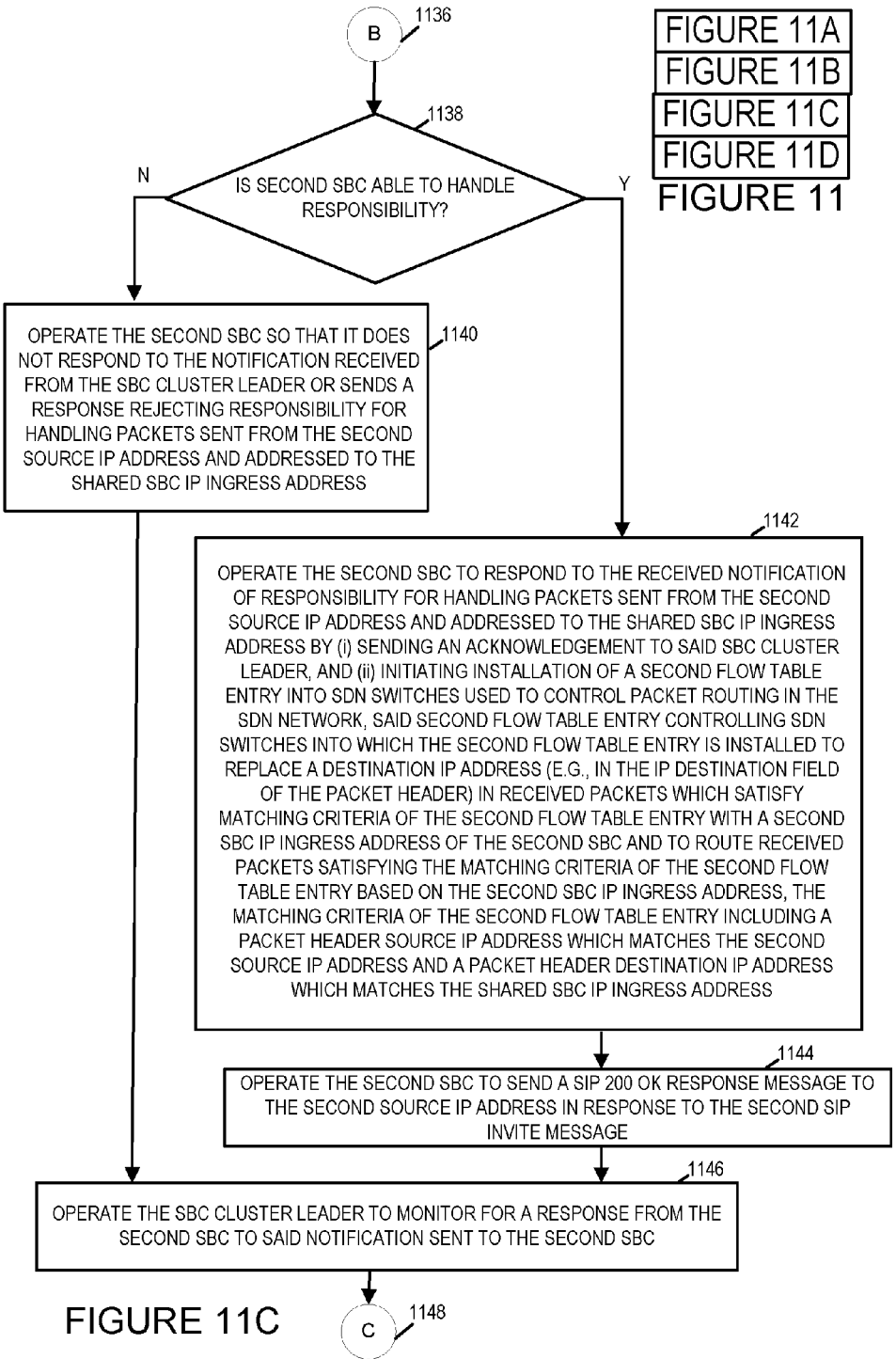

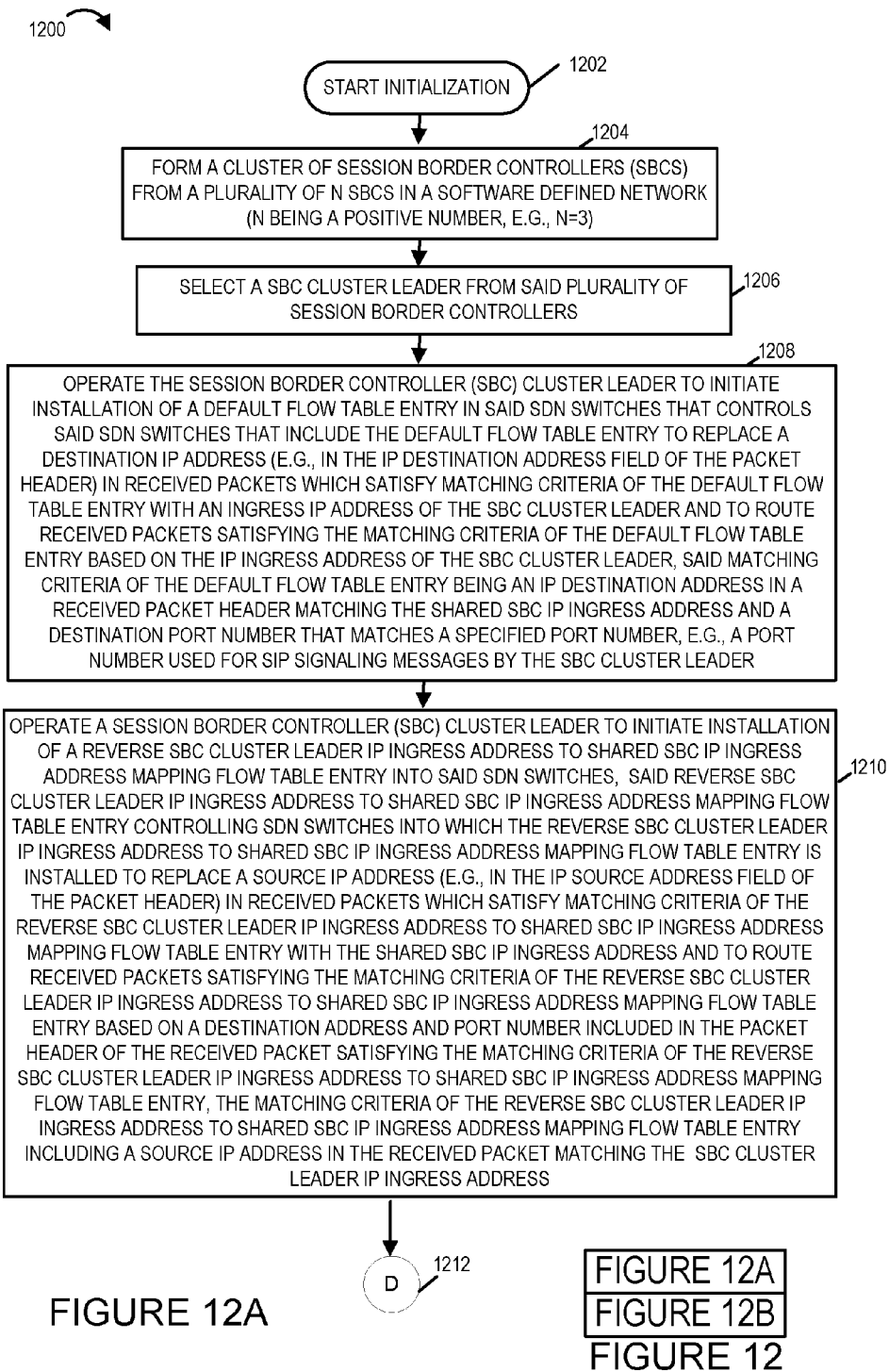

METHODS AND APPARATUS FOR LOAD BALANCING IN SDN NETWORKS

RELATED APPLICATION

The present application is a continuation in part of U.S. patent application Ser. No. 15/168,841 filed on May 31, 2016 and claims the benefit of U.S. Provisional Patent Application Ser. No. 62/507,171 filed on May 16, 2017 both of which are hereby expressly incorporated by reference in their entirety.

FIELD

The present invention relates to methods and apparatus for load balancing in Software Defined Networking (SDN) networks. In particular the present invention relates to self-directed distribution of Session Initiation Protocol (SIP) load across a cluster of Session Border Controllers (SBCs) using facilities of a Software Defined Networking (SDN)-enabled network such as for example a network using SDN switches, e.g., OpenFlow switches or OpenFlow-type switches.

BACKGROUND

The universal methodology for load balancing in the Web environment is the front-end load balancer (FE LB). This is a natural fit for HTTP transactions which are short-lived, non-real-time, and crowd-to-server. Some SBC application use cases are similar to the HTTP usage and, for these, a similar FE LB approach is applicable. The FE LB, however, is not a general solution to load balancing for a SBC service. To address the wider range of deployments, another system architecture calls for a Domain Name System (DNS)-based load balancing solution wherein a first stage of load-balancing occurs when the peers use DNS for resolution. This is followed by a second stage of load balancing with the elements of the SBC cluster internally retarget a portion of requests as necessary.

While the DNS based approach is generic and widely applicable, it is not ideal. The use of DNS mapping to individual SBC addresses has several disadvantages. First, it requires that the peers use RFC 3263 style DNS resolution for SIP services. While this support is widespread, it is not universal in all networks. Second, it does not provide a single IP address appearance for signaling since DNS is resolved to the individual server addresses. And third, it complicates horizontal scaling as the DNS infrastructure has to be updated when SBC instances are added or removed.

SUMMARY

The present invention is directed to various features relating to methods, systems and apparatus for balancing Session Initiation Protocol (SIP) loads across a cluster of Session Border Controllers, in a Software Defined Networking system in a highly scalable manner. One or more embodiments of the present invention addresses one or more of the various technical problems described above and herein and improves upon the efficiency and effectiveness of balancing SIP loads across a cluster of SBCs in a SDN network. Various embodiments of invention solve a communications centric problem of how to distribute SIP transactional loads among a plurality of SBCs in an SDN network using IP address rewriting and forwarding techniques.

The present invention describes a load balancing scheme across a cluster of SBCs based on the capabilities now available in an SDN-enabled network. More particularly, this invention uses the pinholing, forwarding, and IP address rewriting function of an SDN switch network such as for example an OpenFlow switch network to distribute the traffic from a set of peers across a set of SBCs. The scheme of the present invention eliminates the disadvantages of the DNS approach while remaining highly scalable and deployable across a wide variety of SBC use cases. For example, it does not require DNS based load sharing (though it can be used in conjunction with DNS for the name resolution service), it presents a single logical address for (ingress) signaling, and it allows horizontal scaling without additional requirements on the DNS infrastructure. Furthermore, by isolating the packet processing requirements to the (hardware) SDN switches, e.g., OpenFlow switches, the architecture scales linearly with the underlying networking capacity.

One exemplary embodiment of the invention includes a method of assigning responsibility for processing of Session Initiation Protocol (SIP) messages addressed to a shared SBC IP ingress address including the steps of: (i) operating a SBC cluster leader to receive a first SIP invite message and assign responsibility for processing the first SIP invite message to a first SBC in a plurality of SBCs, said plurality of SBCs being a cluster of SBCs, the SBC cluster leader being the leader of the cluster of SBCs, the first SIP invite message including a first SIP packet header including a first source IP address; and (ii) operating the first SBC to initiate installation of a first flow table entry into SDN switches used to control packet routing in an SDN network, said SDN switches including at least a first SDN switch, said first flow table entry controlling SDN switches into which the first flow table entry is installed to replace a destination IP address in received packets which satisfy matching criteria of the first flow table entry with a first SBC IP ingress address of the first SBC and to the route received packets matching the criteria of the first flow table entry based on the first SBC IP ingress address. The matching criteria of the first flow table entry includes a packet header source IP address which matches the first source IP address and a packet header destination IP address which matches the shared SBC IP ingress address.

In some method embodiments, the method includes the step of operating the SBC cluster leader to notify the first SBC of responsibility for handling packets sent from the first source IP address and addressed to the shared SBC IP ingress address. In some of these method embodiments, operating the SBC cluster leader to notify the first SBC of responsibility for handling packets sent from the first source IP address and addressed to the shared SBC IP ingress address includes forwarding the first SIP invite message to the first SBC.

In some method embodiments, the method further includes the steps of operating the SBC cluster leader to: (i) receive a second SIP invite message and assign responsibility for processing the second SIP invite message to a second SBC in the plurality of SBCs, said second SIP invite message including a second SIP packet header including a second source IP address which is different from said first source IP address; and (ii) send a notification to the second SBC of responsibility for handling packets sent from the second source IP address and addressed to the shared SBC IP ingress address.

In another embodiment, the SBC cluster leader monitors for a response from the second SBC to said notification. In some such embodiments, the method includes the further steps of operating the second SBC to: receive the notification of responsibility for handling packets sent from the second source IP address and addressed to the shared SBC IP ingress address and to respond to the received notification of responsibility for handling packets sent from the second source IP address and addressed to the shared SBC ingress address by: i) sending an acknowledgement to said SBC cluster leader, and ii) initiating installation of a second flow table entry into SDN switches used to control packet routing in the SDN network, said second flow table entry controlling SDN switches into which the second flow table entry is installed to replace a destination IP address in received packets which satisfy matching criteria of the second flow table entry with a second SBC IP ingress address of the second SBC and to route received packets satisfying the matching criteria of the second flow table entry based on the second SBC IP ingress address. In some embodiments, the matching criteria of the second flow table entry includes a packet header source IP address which matches the second source IP address and a packet header destination IP address which matches the shared SBC IP ingress address.

The present invention is applicable to apparatus and system embodiments wherein one or more devices implement the steps of the method embodiments. In some apparatus embodiments the SBCs and each of the other apparatus/devices of the system include a processor and a memory, the memory including instructions when executed by the processor control the apparatus/device of the system to operate to perform the steps of various method embodiments of the invention.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 12 illustrates the combination of FIGS. 12A and 12B.

FIG. 12A illustrates a first part of a flowchart showing the steps of an exemplary system initialization method in accordance with one embodiment of the present invention.

DETAILED DESCRIPTION

The present application incorporates U.S. patent application Ser. No. 15/168,841 filed on May 31, 2016 and U.S. Provisional Patent Application Ser. No. 62/507,171 filed on May 16, 2017 in their entirety. To the extent that any language, terminology or descriptions of system or component operation are counter or incompatible with the description included in the present utility application the language and description of the present utility application is to be interpreted as the controlling language and/or description to be used for purposes of understanding the present application and with regard to interpreting the claims to the extent that the language or description is needed to understand or interpret the claims.

Figure 1:
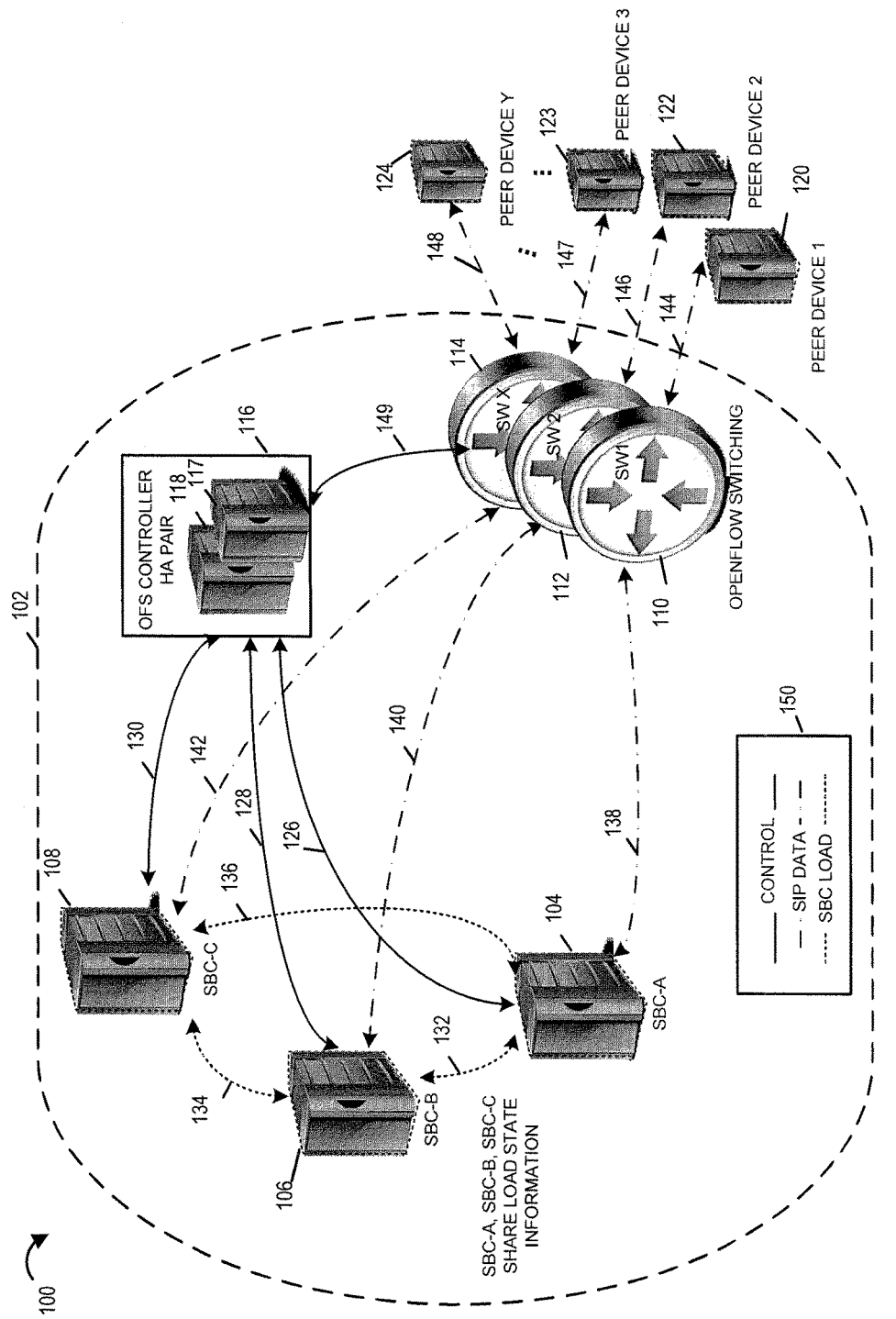
FIG. 1 illustrates an exemplary communications system in accordance with one embodiment of the present invention.

FIG. 1 illustrates an exemplary communications system 100 in accordance with an exemplary embodiment. Communications system 100 includes a Software Defined Networking (SDN) network 102, e.g., an OpenFlow network, and a plurality of peer devices including peer device 1 120, peer device 2 122, peer device 3 123, . . . , peer device Y 124, Y being a positive integer number. The SDN network 102 includes SDN communications switches SW 1 110, SW 2 112, . . . , SW X 114 (X being a positive number), e.g., OpenFlow Switches, a plurality of Session Border Controllers, SBC-A 104, SBC-B 106 and SBC-C 108, and a SDN network controller 116, e.g., high availability (HA) SDN network controller pair including a primary controller 117 and a redundancy controller 118 illustrated as an Open Flow Switch Controller HA pair. In some embodiments SDN controller is co-located with a SBC or a SDN switch. The peer devices 120, 122, 123, . . . , 124 may be, and in some embodiments are, endpoint devices such as for user equipment devices including for example a mobile or stationary communications device, such as a cellular phone, fixed wired phone, smartphone, tablet device, laptop computer or other communications device. The peer devices 120, 122, 123, . . . , 124 may be, and in some embodiments are, Session Border Controllers which are not part of the SDN network. SBC-A 104, SBC-B 106 and SBC-C 108 from a group or cluster of SBCs in the SDN network. While in the exemplary system 100 only three Session Border Controllers, SBC-A 104, SBC-B 106 and SBC-C 108, are included in the group or cluster of SBCs in the SDN network, it should be understood that the cluster of SBCs can be comprised of N SBCs, where N is a positive integer. The SDN network includes communications links which couple/connect the various devices of the SDN network together and are used for communicating and exchanging information, signals and messages between the various devices of the communications system 100. For explanatory purposes, the legend 150 has been provided to explain some of the types of signaling, information and/or messages which are exchanged between various devices in the exemplary method described below.

Each of the communications switches SW 1 110, SW 2 112, ..., SW X 114 is coupled to the SDN controller 116 via one or more communications links. Communications link 149 is representative of one or more communications and is illustrated as coupling the SDN communications switches SW 1 110, SW 2 112, ..., SW X 114 to the SDN controller 116. Each of the SDN switches SW 1 110, SW 2 112, ..., SW X 114 are also coupled to each of the SBCs 104, 106, and 108. Communications link 138 represents one or more communications links that couple SBC-A 104 to the SDN switches 110, 112, ..., 114. Communications link 140 represents one or more communications links that couple SBC-B 106 to the SDN switches 110, 112, ..., 114. Communications link 142 represents one or more communications links that couple SBC-C 108 to SDN switches 110, 112, and 114.

Each of the SBCs 104, 106, and 108 are coupled together via one or more communications links. Communications links 132 and 136 couple SBC-A 104 to SBC-B and SBC-C respectively. Communications link 134 couples SBC-B 106 to SBC-C 108. Each of the SBCs 104, 106, and 108 also coupled/connected to the SDN controller 116 via one or more communications links. Communications links 126, 128 and 130 couple the SDN controller 116 to SBC-A 104, SBC-B 106 and SBC-C 108 respectively.

SBC-A 104, SBC-B 106 and SBC-C 108 form a cluster or group of SBCs that are networked together and connected outside the cluster via the SDN switches 110, 112, ..., 114 which in the example of FIG. 1 are OpenFlow switches. The SDN OpenFlow switches in the example system 100 form a single switching fabric providing any-SBC-to-any-peer device connectivity. The SDN switches SW 1 110, SW 2 112, ..., SW X 114 direct traffic, both signaling and media, to an SBC based on the flow rules installed in each of the SDN switches.

The peer device 1 120 is coupled to SDN switch SW 1 110 via communications link 144. The peer device 2 122 is coupled to switch SW 2 112 via communications link 146. The peer device 3 123 is coupled to switch SW X 114 via communications link 147. The peer device Y 124 is coupled to switch SW X 114 via communications link 148. A plurality of peer devices may be, and in most embodiments are, coupled to each of the SDN communications switches.

Each of the communications links illustrated in FIG. 1 may include one or more channels and may be wired or wireless communications links.

As previously discussed, the various communications links 126, 128, 130, 132, 134, 136, 138, 140, 142, 144, 146, 147, ..., 148, and 149 are used for communicating and exchanging information, signals and messages between the various devices of the communications system 100. In some embodiments, the communications links 126, 128, 130, 149 are used for communicating control information and signals such as for example SDN control signals and information while the communications links 138, 140, and 142 are used for communicating session control signaling data/information e.g., SIP signaling, and communication links 132, 134 and 136 are used for communicating data such as for example SBC's load state information and control information such as instructions as to which SBC of the cluster of SBCs should handle incoming requests, e.g., SIP Invite requests, from a peer device.

Figure 2:
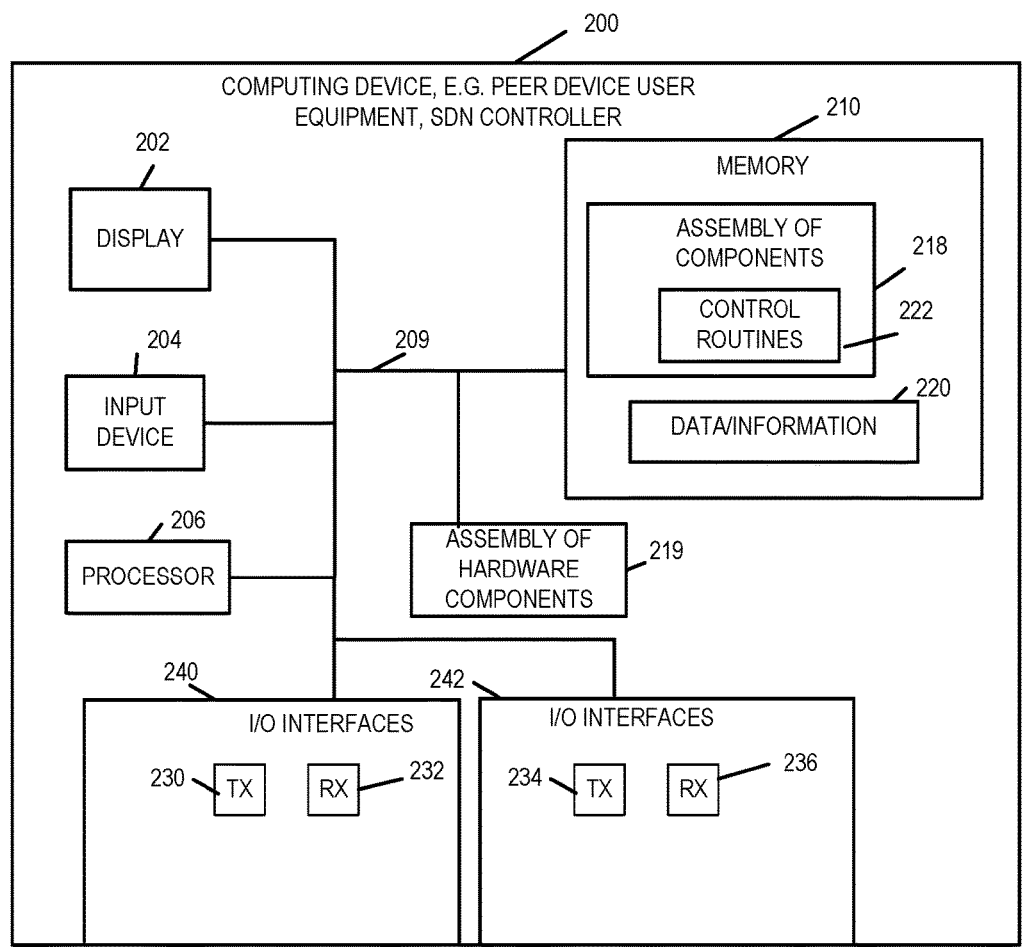
FIG. 2 illustrates an exemplary computing device in accordance with one embodiment of the present invention.

FIG. 2 illustrates an exemplary embodiment of a computing device that may be, and in some embodiments is, used to implement devices of system 100 e.g., a peer device (e.g., a User Equipment (UE) device such as for example, a computer or smartphone), or a SDN controller, in accordance with one embodiment of the present invention. Exemplary computing device 200 includes a display 202, an input device 204, a processor 206, e.g., a CPU, input/output (I/O) interfaces 240 and 242, which couple the computing device to the SDN network 102 or various other networks or devices including e.g. communications switches 110, 112, and 114, memory 210, and an assembly of components 219, e.g., circuits corresponding to different components, coupled together via a bus 209 over which the various elements may interchange data and information. Memory 210 includes an assembly of components 218, e.g., an assembly of software components, and data/information 220. The assembly of software components 218 includes a control routines component 222 which when processed and executed by the processor 206 controls the operation of the computing device 200 to perform various functions and/or one or more steps of the various method embodiments of the invention. The I/O interface 240 includes transmitters 230 and receivers 232. The I/O interface 242 includes transmitters 234 and receivers 236. The I/O Interfaces include hardware transmitters and receivers. The computing device is also configured to have a plurality of Internet Protocol (IP) address/port number pairs, e.g., logical IP address/port pairs, for use in exchanging signaling information, e.g., SIP signaling messages for establishing media sessions, and media, e.g., Real-time Protocol Packets of a media session. In some embodiments the I/O interfaces include IP address/port pairs. The I/O Interfaces are hardware interfaces. The I/O interfaces in some embodiments are configured to communicate in accordance with the Internet Protocol, Transport Control Protocol (TCP), User Datagram Protocol (UDP), Session Initiation Protocol (SIP), Session Description Protocol (SDP), SDN control protocol (e.g., OpenFlow protocol) and/or other communications protocols. In some embodiments, the computing device 200 includes a communication component configured to operate using SDN, IP, TCP, UDP, SDP, and/or SIP protocol signaling methods. In some embodiments, the communication component is a hardware component, a software component or a component including hardware and software components. In some embodiments, the peer devices 120, 122, 123, ..., 124 of FIG. 1 are user equipment devices implemented in accordance with computing device 200 of FIG. 2. In some embodiments, the SDN controller 116 of FIG. 1 is implemented in accordance with the computing device 200 illustrated in FIG. 2. In some such embodiments the communication protocol used to communicate between the SDN controller 116 and various devices such as the SBCs 104, 106, and 108 is based on extending a representational state transfer Application Programming Interface (REST API) provided by the SDN Controller to the device, e.g., SBC. The SDN controller uses OpenFlow protocol or other SDN protocol to dynamically program flows in the SDN switches of the SDN network 102. In some embodiments, the display 202 is optional.

Figure 3:
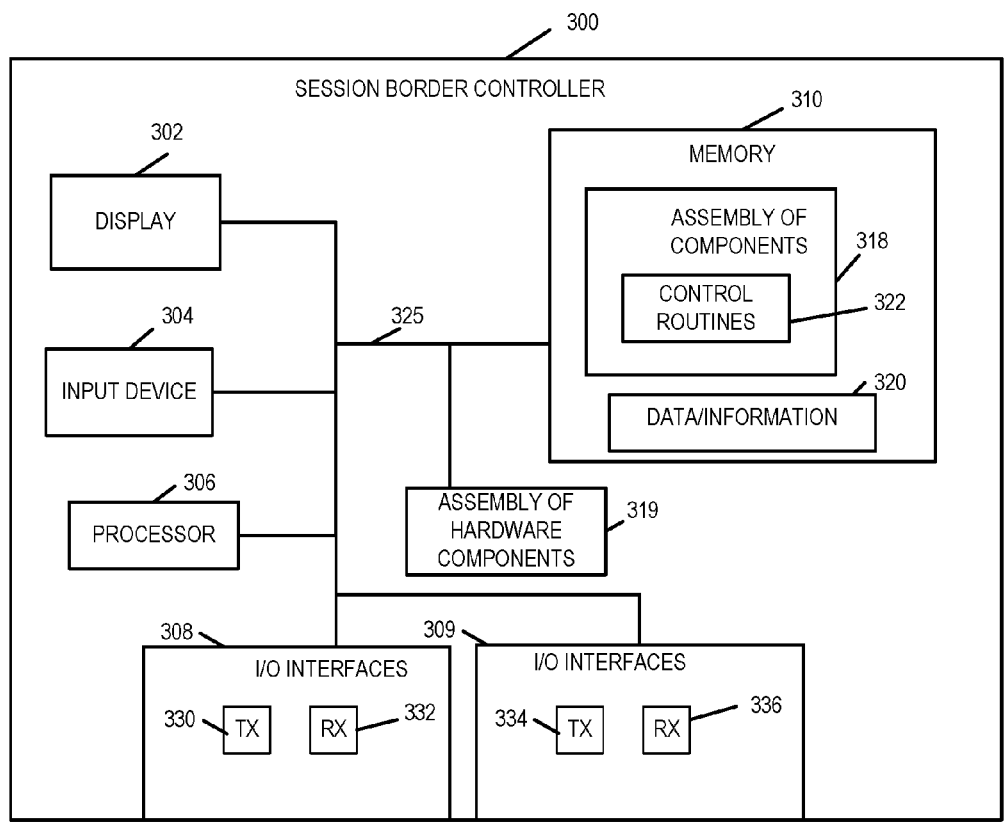
FIG. 3 illustrates an exemplary session border controller in accordance with one embodiment of the present invention.

FIG. 3 illustrates an exemplary embodiment of a Session Border Controller (SBC) 300 in accordance with one embodiment of the present invention. Exemplary session border controller 300 includes an optional display 302, an input device 304, a processor 306, e.g., a CPU, input/output (I/O) interfaces 308 and 309, which couple the SBC 300 to other devices in the SDN network 102 such as for example other SBCs in the cluster, SDN controller 116, and the SDN switches 110, 112, . . . 114, memory 310, and an assembly of hardware components 319, e.g., circuits corresponding to different components or modules, coupled together via a bus 325 over which the various elements may interchange data and information. Memory 310 includes an assembly of components 318, e.g., an assembly of software components, and data/information 320. The assembly of components 318 includes a control routines component 322 which when processed and executed by the processor 306 controls the operation of the SBC 300 to perform various functions and/or one or more steps of the various method embodiments of the invention. The I/O interfaces 308 include transmitters 330 and receivers 332. The I/O interfaces 309 include transmitters 334 and receivers 336. The I/O Interfaces include hardware transmitters and receivers. The SBC 300 is also configured to have a plurality of Internet Protocol (IP) address/port number pairs, e.g., logical IP address/port pairs, for use in exchanging signaling information, e.g., SIP signaling messages for establishing media sessions, and media, e.g., Real-time Protocol Packets of a media session. In some embodiments, a single public IP address/port pair is used for all signaling, e.g., SIP signaling relating to establishing sessions.

The I/O interfaces in some embodiments are configured to communicate in accordance with the Internet Protocol (IP), Transport Control Protocol (TCP), User Datagram Protocol (UDP), Session Initiation Protocol (SIP), Session Description Protocol (SDP), Openflow protocol and/or one or more proprietary signaling protocols. In some embodiments, the SBC 300 includes a communication component configured to operate using one or more IP, TCP, UDP, SIP, SDP, SDN Openflow and/or proprietary protocol methods. The SBC communicates with the SDN Controller in some embodiments using a protocol that is not bounded. In some embodiments, the communication component is a hardware module, a software module or a module including hardware and software components. In some embodiments, the SBC-A 104, SBC-B 106, and SBC-C 108 are implemented in accordance with SBC 300 of FIG. 3. In some embodiments, the SBC 300 is implemented as a virtual machine operating on a computing device in the cloud.

Figure 4:
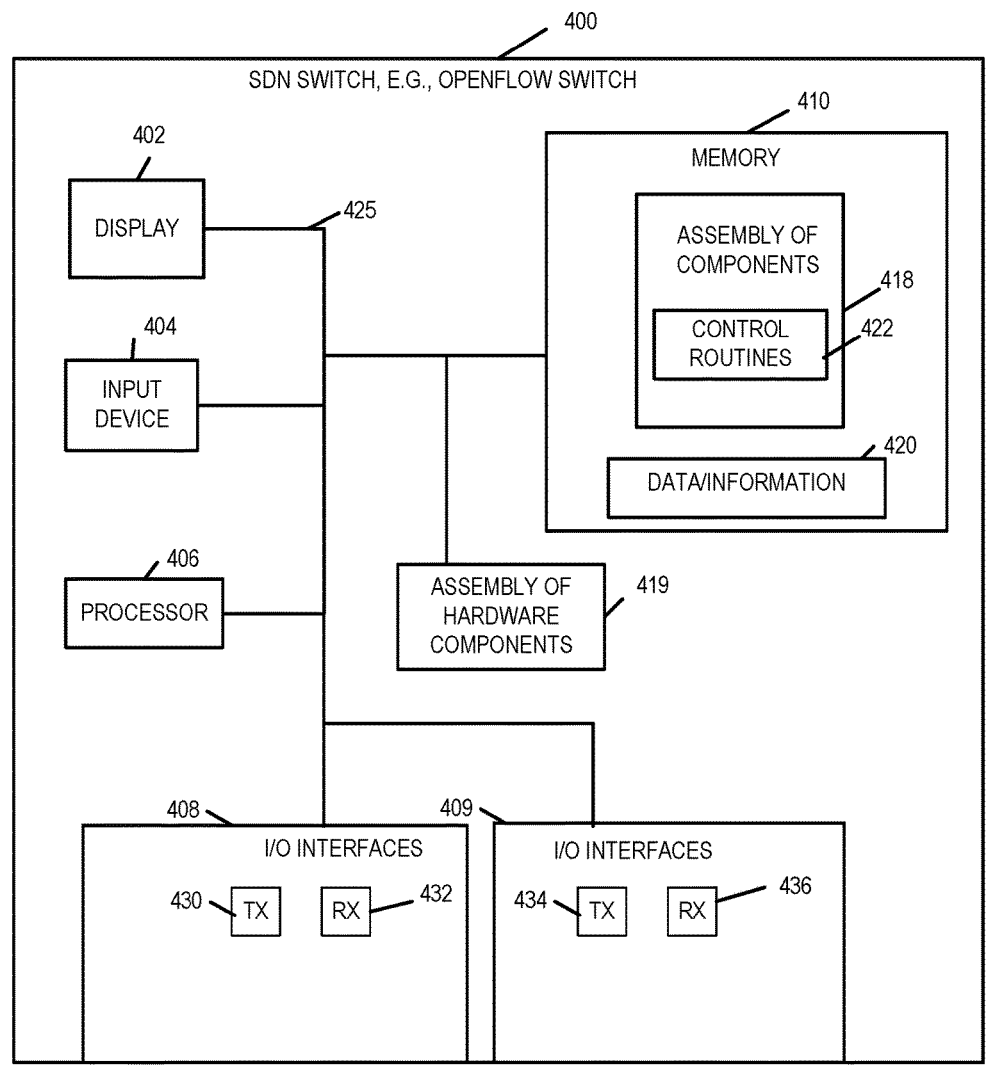
FIG. 4 illustrates an exemplary SDN switch in accordance with one embodiment of the present invention.

FIG. 4 illustrates an exemplary embodiment of a SDN switch device 400 in accordance with one embodiment of the present invention. Exemplary SDN switch 400 includes a display 402, an input device 404, a processor 406, e.g., a CPU, input/output (I/O) interfaces 408 and 409, which couple the switch device to a core network or various other devices including for example remote devices, SBC devices, controller, other switch devices, and endpoint devices, such as user equipment, memory 410, and an assembly of modules 419, e.g., circuits corresponding to different modules, coupled together via a bus 425 over which the various elements may interchange data and information. Memory 410 includes an assembly of modules 418, e.g., an assembly of software modules, and data/information 420. The assembly of components 418 includes a control routines component 422 which when processed and executed by the processor 406 controls the operation of the SDN switch 400 to perform various functions and/or one or more steps of the various method embodiments of the invention. The I/O interfaces 408 include transmitters 430 and receivers 432. The I/O interfaces 409 include transmitters 434 and receivers 436. The I/O Interfaces include hardware transmitters and receivers. The switch device is also configured to have a plurality of Internet Protocol (IP) address/port number pairs, e.g., logical IP address/port pairs, for use in exchanging signaling information, e.g., SIP signaling messages for establishing media sessions, and media, e.g., Real-time Protocol Packets of a media session. The switch has a plurality of public IP/port number pairs as well as private IP/port number pairs used for media sessions.

The I/O interfaces in some embodiments are configured to communicate in accordance with the Internet Protocol, Transport Control Protocol, User Datagram Protocol (UDP), Session Initiation Protocol (SIP), Session Description Protocol (SDP), OpenFlow protocol and/or one or more proprietary protocols. In some embodiments, the switch 400 includes a communication component configured to operate using IP, TCP, UDP, SIP, SDP, OpenFlow protocol methods. In some embodiments, the communications component is a hardware component, a software component or component including hardware and software components. In some embodiments, the SDN switch 400 includes one or more components for matching a packet to a flow based on the contents of the IPv4 or IPv6 packet header and modifying the IP address before forwarding. Furthermore, the SDN switch supports dynamically adding and removing flows in near real-time. In some embodiments, the SDN switch devices 110, 112, . . . , 114 and 102 of FIG. 1 are implemented in accordance with SDN switch device 400. In some embodiments, the switch is implemented on hardware such as computer hardware that is deployed in the cloud. In some embodiments, the switch is implemented as a virtual machine on computer hardware that may be deployed in the cloud or on the Internet.

It is to be understood that system 100 is only an exemplary communications system embodiment and that the invention may be practiced on other communications systems.

The present invention relates to self-directed distribution of Session Initiation Protocol (SIP) load across a cluster of Session Border Controllers (SBCs) using facilities of a Software Defined Networking (SDN)-enabled network (such as for example one using SDN switches, e.g., OpenFlow switches or OpenFlow-type switches.

The solution is predicated on a decomposition of the load balancing for SIP traffic between a SBC, e.g., a virtualized SBC and an SDN comprised of network switches capable of applying packet rewriting and forwarding to flows.

Figure 5:
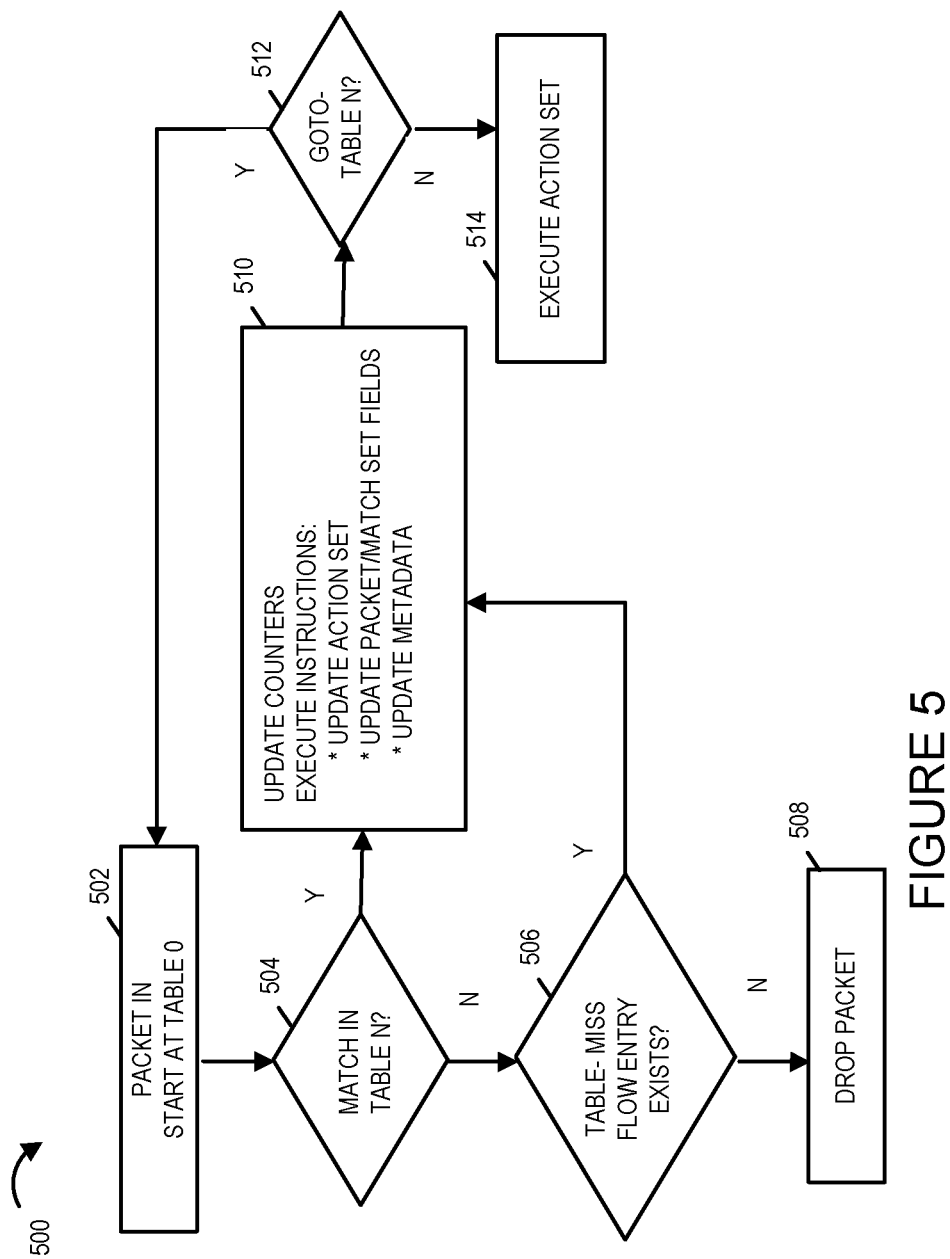
FIG. 5 illustrates a diagram of a high level path of a packet through an OpenFlow 1.4+ capable switch.
Figure 10:
FIG. 10 illustrates the protocol levels which may be modified by an Open Flow switch.

Exemplary SDN switches 110, 112, . . . , 114 of FIG. 1 are OpenFlow 1.4+ capable switches. While in this example OpenFlow switches have been shown other controllable switches may be, and in some embodiments, are used. Diagram 500 of FIG. 5 is a diagram from the OpenFlow 1.4 Specification, copyrighted 2013 published by The Open Networking Foundation, which illustrates the high level path of a packet through the exemplary switch 110. FIG. 10 illustrates the protocol levels which may be modified by an OpenFlow switch. As shown in diagram 1000 of FIG. 10 the levels L1, L2, L2.5, L3 and L4 may be modified by an Open Flow switch.

A general high level explanation of diagram 500 will now be provided but a more detailed explanation may be found in the OpenFlow 1.4 Specification. In step 502 a packet is received at the switch and processing starts at table N, N being 0. Operation proceeds from step 502 to decision step 504. In decision step 504 a determination is made if there is a match in table N. If it is determined that there is a match operation proceeds to step 510. If there is not a match in Table N then operation proceeds to decision step 506. In decision step 506, the switch determines if a table-miss flow entry exists. If a table-miss flow entry exists then operation proceeds to step 510 otherwise operation proceeds to step 508. In step 508 the received packet is dropped.

Returning to step 510, in step 510 the switch updates counters and executes instructions. The action set is updated, the packet/match set fields are updated and the metadata is updated. Operation proceeds from step 510 to decision step 512. In decision step 512, the switch determines if processing in accordance with Table N is to be implemented. If the determination is yes, then operation proceeds to step 514 in which actions set in table N is executed. If it is determined in step 512 not to proceed to executing the instructions in table N then operation proceeds to step 502.

The architecture of the OpenFlow switch specifies a set of flow tables. Each flow table comprises flow entries consisting of matching criterion, priority, and actions. When a packet is received, it is matched against the entries in the first flow table and the highest priority match is selected. The actions for that match are then executed. These actions can be quite complex and can include additional matching, policing, and packet rewriting. For the sake of simplicity and clarity with respect to explaining the invention, focus will be placed on the actions that rewrite the source or destination IP packet address, and forwarding of a packet to or from a specific logical network. The specifics described above in connection with the exemplary switch 110 are particular to an OpenFlow switch supporting version 1.4 of the specification. Relevant functionality of the switch as it pertains to one or more embodiments of the present invention include that the switch should provide the ability to match a packet to a flow based on the contents of the Internet Protocol version 4 (IPv4) or Internet Protocol version 6 (IPv6) header, the UDP/TCP header and the ability to modify the IP address before forwarding. Additionally, the switch should have the ability to dynamically, such as in near real-time, add, remove, and modify parameters of the flow (e.g., by a change in the matching criterion). A packet matches a flow table entry if the values in the packet match fields used for the lookup match those defined in the flow table entry. The packet is matched against the table and only the highest priority flow entry that matches the packet is selected. In some embodiments, the switch includes one or more components or logic that may be implemented in software, hardware, e.g., circuits, or a combination of software and hardware to perform the functionality described. In some embodiments, a processor and/or device in the switch performs the aforementioned functionality described.

An exemplary embodiment of present invention will now be described in connection with system 100 illustrated in FIG. 1. SBC-A 104, SBC-B 106 and SBC-C form a load balancing cluster or group of SBCs. These SBCs are networked together and connected outside the cluster via SDN switches, e.g., OpenFlow switches (OFSs). The SDN switches form a single switching fabric providing any-SBC-to-any-peer connectivity. The SDN switches direct traffic, both signaling and media, to an SBC based on the flow rules installed in each SDN switch.

The SIP session transactions that form the load for the SBC cluster will be calls in this example, e.g., Voice Over Internet Protocol (VOIP) calls implemented through the use of SIP sessions. The calls on each SBC are segregated by direction with separate signaling addresses used for ingress versus egress calls, and load-balancing by this invention applies to ingress calls. The SBC-A 104, SBC-B 106, and SBC-C 108 have ingress SIP signaling addresses of IP-1, 2, and 3 respectively, and the SBC group or cluster has a shared ingress SIP signaling address of IP-0. The shared ingress SIP signaling address of IP-0 is an actual SIP signaling IP address that is given the logical construct of being associated with the SBC group or cluster. While the shared ingress SIP signaling address is sometimes referred to as a virtual or logical IP address it is an actual address in the Internet Protocol address space but is a virtual or logical address because it represents a virtual or logical SBC in the sense that the cluster or group of SBCs is seen as a single SBC from the peer devices that send ingress session requests to the SBC cluster or group. Egress calls use different SBC signaling addresses to avoid an undesirable rewriting of source IP addresses for egress signaling. Egress calls or sessions are those calls or sessions which are initiated by the SBC to another device, e.g., a peer device. When an SBC is acting as a back-to-back user agent (B2BUA) in establishing a session between a first device and a second device that is initiated by the first, the first device sends a SIP Invite message to an ingress IP address associated with the SBC and the SBC sends a SIP Invite message to the second device via its egress IP address. In this example, SBC-A 104, SBC-B 106, and SBC-C 108 have egress signaling addresses of IP-4, 5, 6 respectively.

When SBC-A 104, SBC-B 106, and SBC-C 108 activate, for this group of SBCs a group leader is designated or elected. Many different algorithms may be utilized to select a SBC group or cluster leader. However, the utilized approach should meet basic group election requirements including convergence—i.e. the time to elect the leader is bounded—and consistency—everyone in the group/cluster agrees on the leader. The SBC cluster leader is the gatekeeper and coordinator of the group. Requests from a new SIP peer device are first handled by the SBC cluster leader which acts as the gatekeeper and then delegated to a client SBC by the SBC group leader based on the transaction load state information the SBC cluster leader maintains as explained in further detail below. From that point, all call/session handling associated from that particular peer is handled by the chosen SBC client. The term SBC group leader and SBC cluster leader are used interchangeably herein.

The ingress session transaction load balancing process starts after the SBC group leader is chosen. Each of the SBCs in the cluster of SBCs commences asynchronously generating session transaction load state information on a recurring basis reflecting its current session transaction load state. Each of the client SBCs report the generated session transaction load state information to the SBC group leader. The client SBCs may report and/or share their generated load state information by transmitting it to the SBC group leader on a recurring basis. The recurring basis may be on an asynchronous or periodic basis. The SBC group leader receives on a recurring basis the generated session transaction load state information from each of the client SBCs in the group and stores and/or maintains the session transaction load information on each of the SBCs of the cluster of SBCs in a data record in memory. In some embodiments, the client SBCs share their generated session transaction load by storing it in a shared storage device or memory that is accessible to all of the SBCs of the cluster. In such embodiments, the client SBCs' generated session transaction load states do not need to be transmitted to the SBC group leader as the SBC group leader can access them directly from the shared storage device or memory. In some embodiments, the SBC generates an approximate session transaction load based on the number of sessions being handled and/or the processing resources being used or being reserved for use by those sessions. The SBC group leader maintains bookkeeping of the reported and/or approximate session transaction load on each SBC client in the group by storing the information in records. In some cases, the session transaction load state information may only be an approximation of the actual session transaction load on a SBC because after the information was generated and reported the SBC session load was modified for example because one or more sessions was terminated or added or additional resources were requested or released.

Each SBC, e.g., an SBC instance when the SBC cluster is implemented as virtual SBCs, installs in the SDN switches a (reverse) mapping of its local IP address to the shared IP address of the SBC cluster. In some embodiments this is accomplished by each SBC of the group of SBCs sending control information to a SDN controller which controls the SDN switches. The control information sent from each of the SBCs of the group causing the SDN controller to install a flow table entry in the SDN switches mapping the ingress local SIP signaling addresses of the SBC to the shared group ingress SIP signaling address of the SBC group or cluster. A flow table entry is identified by its match fields and priority. The match fields and priority taken together identify a unique flow entry in the flow table. The flow entry that wildcards all fields and has priority equal to 0 is called the table-miss flow entry, each of these flow table entries having a first priority level.

Figure 6:
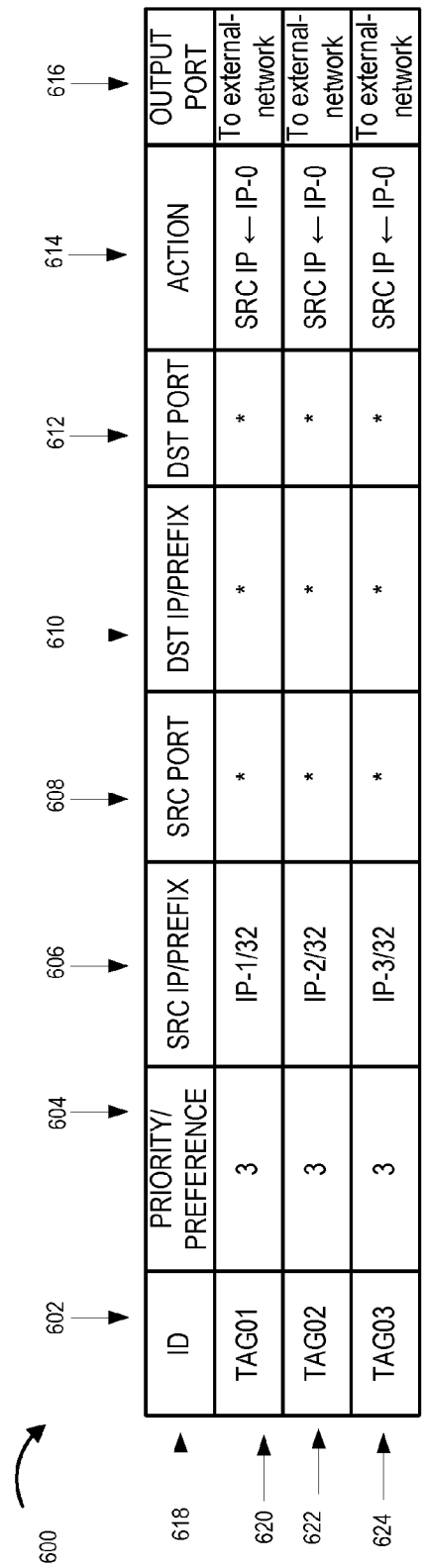
FIG. 6 illustrates a table 600 including exemplary SDN switch flow table entry rules in accordance with an embodiment of the present invention.

Table 600 of FIG. 6 illustrates flow table entries that are installed in the SDN switches 110, 112, . . . , 114 of the SDN network 102 for ingress call signaling for SBC-A 104, SBC-B 106, and SBC-C 108. The entries for row 618 of the table are labels or identifiers which are provided for explanatory purposes. These entries identify the information contained in each of the columns. Each of rows 620, 622, and 624 in the table 600 contains information relating to a specific table entry. The entries in column 602 includes table entry identifiers. The entries in column 604 identify the priority/preference to be applied to the table entry. The entries in column 606 are source IP address/prefix numbers to be used for matching against a received packet's source IP address included in the packet's header information. The IP address shown in table 600 are shown as IPV4 IP addresses which are 32 bits in length. The invention is also applicable to IPV6 IP addressing in which the IP address are 128 bits in length. When IPV4 IP address are being matched the prefix is 32 bits; when IPV6 addresses are being matched the prefix is 128 bits. The entries in column 608 are source port numbers to be used for matching against a received packet's source port information included in the packet's header information. The entries in column 610 are destination IP address/prefix numbers to be used to match against received destination address included in the packet's header information. The entries in column 612 are destination port numbers to be used to match against received packet's destination port included in the received packet header information. The entries in column 614 are actions, e.g., IP address/port rewriting and/or packet forwarding, to be taken by the SDN switch when the matching criteria for a flow entry are meet and the flow entry has the highest priority of flow table entries with matching criteria, the matching criteria being, e.g., received packet header source IP, source port, destination IP address, and destination port match the corresponding entries in a flow table entry. Column 616 identifies the SDN switch output port on which the received packet after alteration is to be outputted.

The entry (column 602, row 620) states "TAG01," as the entries in row 620 specify a flow table entry 01. The information contained in row 620 is flow table entry installed for SBC-A 104 with a flow table entry identifier of TAG01 (column 602, row 620), priority/preference of 3 (column 604, row 620), matching criteria Source IP address/prefix of IP-1/32 (column 606, row 620), matching criteria source port number of * indicating a wildcard (column 608, row 620), matching criteria of destination IP address/prefix of * indicating a wildcard (column 610, row 620), matching criteria of destination port number of * indicating a wildcard (column 612, row 620), action of SRC IP<---IP-0 which instructs the SDN switch to replace the source IP address in received packets that match the table entry with the IP address of IP-0 when the action is to be executed (column 614, row 620), and output port (column 616, row 620) with entry of "to-external-network" indicating that the received packet is to be outputted to external network from the SDN switch output port that is connected to the external-network (column 616, row 620). The TAG01 table entry provides a mapping of the SBC-A 104 local IP address IP-1 to the shared IP address of the SBC cluster IP-0. When a SDN switch with this table entry receives a packet from SBC-A 104, the SDN switch will match the source address in the packet which will be IP-1 to the source IP-1/32 (IPV4 32 bit address) in column (606, 620) and find a match as the SRC port and DST IP/prefix and DST port entries in row 620 are all wildcards the received data packet from SBC-A 104 will meet the matching criteria for the packet. With the matching criteria met the SDN switch will perform the action described in column 614, row 620 when the flow entry has the highest priority/preference of matching flow entries in the table. The action that is then perform by the SDN switch is that of rewriting the source IP address in the received packet header to be the shared ingress source IP address for the SBC cluster which is IP-0 and then output the rewritten packet to the external network as identified in column 616, row 620. In this way, the local IP address that a peer device receives in response to SIP messages sent to the SBC-A 104 will include the SBC shared ingress cluster IP address IP-) instead of the SBC-A 104 ingress local IP address of IP-1.

The entry (column 602, row 622) states "TAG02," as the entries in row 622 specify a flow table entry 02. The information contained in row 622 is flow table entry installed for SBC-B 106 with a flow table entry identifier of TAG02 (column 602, row 622), priority/preference of 3 (column 604, row 622), matching criteria Source IP address/prefix of IP-2/32 (column 606, row 622), matching criteria source port number of * indicating a wildcard (column 608, row 622), matching criteria of destination IP address/prefix of * indicating a wildcard (column 610, row 622), matching criteria of destination port number of * indicating a wildcard (column 612, row 622), action of SRC IP<---IP-0 which instructs the SDN switch to replace the source IP address in received packets that match the table entry with the IP address of IP-0 when the action is to be executed (column 614, row 622), and output port (column 616, row 622) with entry of "to-external-network" indicating that the received packet is to be outputted to external network from the SDN switch output port that is connected to the external-network (column 616, row 622). The TAG02 table entry provides a mapping of the SBC-B 106 local ingress IP address IP-2 to the shared ingress IP address of the SBC cluster IP-0. When a SDN switch with this table entry receives a packet from SBC-B 106, the SDN switch will match the source address in the packet which will be IP-2 to the source IP-2/32 (IPV4 32 bit address) in column (606, 622) and find a match as the SRC port, DST IP/prefix and DST port entries matching criteria in row 622 are all wildcards the received data packet from SBC-B 106 will meet the matching criteria for the packet. With the matching criteria met the SDN switch will perform the action described in column 614, row 622 when the flow entry has the highest priority/preference of matching flow entries in the table. The action that is then performed by the SDN switch is that of rewriting the source IP address in the received packet header to be the shared ingress source IP address for the SBC cluster which is IP-0 and then output the rewritten packet to the external network as identified in column 616, row 622. In this way, the local IP address that a peer device receives in response to SIP messages sent to the SBC-B 106 will include the SBC shared ingress cluster IP address IP-0 instead of the SBC-B 106 ingress local IP address of IP-2.

The entry (column 602, row 624) states "TAG03," as the entries in row 624 specify a flow table entry 03. The information contained in row 624 is flow table entry installed for SBC-C 108 with a flow table entry identifier of TAG03 (column 602, row 624), priority/preference of 3 (column 604, row 624), matching criteria Source IP address/prefix of IP-3/32 (column 606, row 624), matching criteria source port number of * indicating a wildcard (column 608, row 624), matching criteria of destination IP address/prefix of * indicating a wildcard (column 610, row 624), matching criteria of destination port number of * indicating a wildcard (column 612, row 624), action of SRC IP<---IP-0 which instructs the SDN switch to replace the source IP address in received packets that match the table entry with the IP address of IP-0 when the action is to be executed (column 614, row 624), and output port (column 616, row 624) with entry of "to-external-network" indicating that the received packet is to be outputted to external network from the SDN switch output port that is connected to the external-network (column 616, row 624). The TAG03 table entry provides a mapping of the SBC-C 108 local ingress IP address IP-3 to the shared ingress IP address of the SBC cluster IP-0. When a SDN switch with this table entry receives a packet from SBC-C 108, the SDN switch will match the source address in the packet which will be IP-3 to the source IP-3/32 (IPV4 32 bit address) in column (606, 624) and find a match as the SRC port, DST IP/prefix and DST port entries matching criteria in row 624 are all wildcards the received data packet from SBC-C 108 will meet the matching criteria for the packet. With the matching criteria met the SDN switch will perform the action described in column 614, row 624 when the flow entry has the highest priority/preference of matching flow entries in the table. The action that is then performed by the SDN switch is that of rewriting the source IP address in the received packet header to be the shared ingress source IP address for the SBC cluster which is IP-0 and then output the rewritten packet to the external network as identified in column 616, row 624. In this way, the local IP address that a peer device receives in response to SIP messages sent to the SBC-C 108 will include the SBC shared ingress cluster IP address IP-0 instead of the SBC-C 108 ingress local IP address of IP-3.

As previously explained egress calls use different SBC signaling addresses to avoid an undesirable rewriting of source IP addresses for egress signaling. SBC-A 104, SBC-B 106, and SBC-C 108 have egress signaling addresses of IP-4, 5, 6 respectively. In addition to the above flow table entries for the SBCs ingress signaling, the SDN switches will have flow table entries installed for egress signaling. Note, however, that these additional egress flow table entry rules are merely for network connectivity for egress calls and are irrelevant for the ingress load balancing features of the present invention. In the same manner as which the SBCs of the cluster installed the ingress table entry rules, the SBCs of the cluster install their respect egress table entry rules by sending control information to the SDN controller 116 which installs the table entries into the SDN switches of the SDN network 102.

Figure 7:
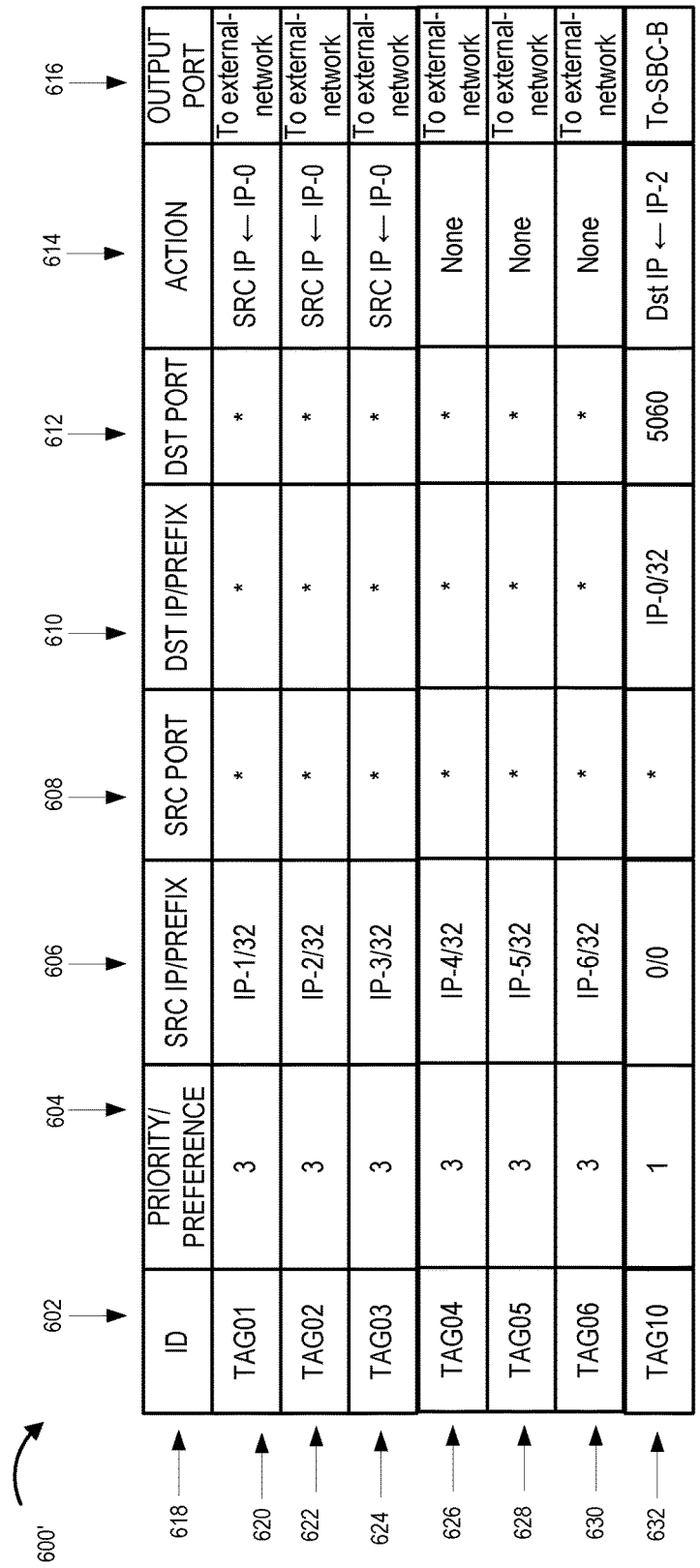
FIG. 7 illustrates table 600' which is table 600 augmented to include additional exemplary SDN switch flow table entry rules in accordance with an embodiment of the present invention.

Table 600' of FIG. 7 illustrates flow table entries that are installed in the SDN switches 110, 112, . . . , 114 of the SDN network 102 for egress call signaling for SBC-A 104, SBC-B 106, and SBC-C 108 in the rows 626, 628 and 630 respectively.

The entry (column 602, row 626) states "TAG04," as the entries in row 626 specify a flow table entry 04. The information contained in row 626 is flow table entry installed for SBC-A 104 with a flow table entry identifier of TAG04 (column 602, row 626), priority/preference of 3 (column 604, row 626), matching criteria Source IP address/prefix of IP-4/32 (column 606, row 626), matching criteria source port number of * indicating a wildcard (column 608, row 626), matching criteria of destination IP address/prefix of * indicating a wildcard (column 610, row 626), matching criteria of destination port number of * indicating a wildcard (column 612, row 626), action of "None" which instructs the SDN switch not to perform any rewrite of the source or destination address in received packets that match the table entry with the IP address of IP-4 when the action is to be executed (column 614, row 626), and output port (column 616, row 626) with entry of "to-external-network" indicating that the received packet is to be outputted to external network from the SDN switch output port that is connected to the external-network (column 616, row 626). The TAG04 table entry ensures that packets received at the SDN switch SBC-A 104 egress IP address IP-4 will not have their source or destination packet header addresses rewritten as long as the priority/preference of the other table entries are less than priority level 3. When a SDN switch with this table entry receives an egress packet from SBC-A 104, the SDN switch will match the source address in the packet which will be IP-4 to the source IP-4/32 (IPV4 32 bit address) in column (606, 628) and find a match as the SRC port, DST IP/prefix and DST port entries matching criteria in row 626 are all wildcards the received data packet from SBC-A 104 will meet the matching criteria for the packet. With the matching criteria met the SDN switch will perform the action described in column 614, row 626 when the flow entry has the highest priority/preference of matching flow entries in the table. The action that is then performed by the SDN switch is that no rewriting the source or destination IP address/port information is to be performed on the received SBC egress packet's packet header. Instead the SDN switch will output the received packet with the same source and destination IP/port included in the packet received from the SBC-A 104 and will output the packet to the external network as identified in column 616, row 626. In this way, the local egress IP address and port that a peer device receives with egress SIP messages sent from the SBC-A 104 will include the SBC's egress IP address and port information. The SBC-A 104 egress IP address and port will not be modified. The cluster of SBCs will not use a shared egress IP address but instead each SBC of the cluster uses it own egress IP address.

The entry (column 602, row 628) states "TAG05," as the entries in row 628 specify a flow table entry 05. The information contained in row 628 is flow table entry installed for SBC-B 106 with a flow table entry identifier of TAG05 (column 602, row 628), priority/preference of 3 (column 604, row 628), matching criteria Source IP address/prefix of IP-5/32 (column 606, row 628), matching criteria source port number of * indicating a wildcard (column 608, row 628), matching criteria of destination IP address/prefix of * indicating a wildcard (column 610, row 628), matching criteria of destination port number of * indicating a wildcard (column 612, row 628), action of "None" which instructs the SDN switch not to perform any rewrite of the source or destination address in received packets that match the table entry with the IP address of IP-5 when the action is to be executed (column 614, row 628), and output port (column 616, row 628) with entry of "to-external-network" indicating that the received packet is to be outputted to external network from the SDN switch output port that is connected to the external-network (column 616, row 628). The TAG05 table entry ensures that packets received at the SDN switch with SBC-B 106 egress IP address IP-5 will not have their source or destination packet header addresses rewritten as long as the priority/preference of the other table entries are less than priority level 3. When a SDN switch with this table entry receives an egress packet from SBC-B 106, the SDN switch will match the source address in the packet which will be IP-5 to the source IP-5/32 (IPV4 32 bit address) in column (606, 628) and find a match as the SRC port, DST IP/prefix and DST port entries matching criteria in row 628 are all wildcards the received data packet from SBC-B 106 will meet the matching criteria for the packet. With the matching criteria met the SDN switch will perform the action described in column 614, row 628 when the flow entry has the highest priority/preference of matching flow entries in the table. The action that is then performed by the SDN switch is that no rewriting the source or destination IP address/port information is to be performed on the received SBC egress packet's packet header. Instead the SDN switch will output the received packet with the same source and destination IP/port included in the packet received from the SBC-B 106 and will output the packet to the external network as identified in column 616, row 628. In this way, the local egress IP address and port that a peer device receives in egress SIP messages sent from the SBC-B 106 will include the SBC's egress IP address and port information. The SBC-B 106 egress IP address and port will not be modified. The cluster of SBCs will not use a shared egress IP address but instead each SBC of the cluster uses it own egress IP address.

The entry (column 602, row 630) states "TAG06," as the entries in row 630 specify a flow table entry 06. The information contained in row 630 is flow table entry installed for SBC-C 108 with a flow table entry identifier of TAG06 (column 602, row 630), priority/preference of 3 (column 604, row 630), matching criteria Source IP address/prefix of IP-6/32 (column 606, row 630), matching criteria source port number of * indicating a wildcard (column 608, row 630), matching criteria of destination IP address/prefix of * indicating a wildcard (column 610, row 630), matching criteria of destination port number of * indicating a wildcard (column 612, row 630), action of "None" which instructs the SDN switch not to perform any rewrite of the source or destination address in received packets that match the table entry with the IP address of IP-6 when the action is to be executed (column 614, row 630), and output port (column 616, row 630) with entry of "to-external-network" indicating that the received packet is to be outputted to external network from the SDN switch output port that is connected to the external-network (column 616, row 630). The TAG06 table entry ensures that packets received at the SDN switch with SBC-C 108 egress IP address IP-6 will not have their source or destination packet header addresses rewritten as long as the priority/preference of the other table entries are less than priority level 3. When a SDN switch with this table entry receives an egress packet from SBC-C 108, the SDN switch will match the source address in the packet which will be IP-6 to the source IP-6/32 (IPV4 32 bit address) in column (606, 630) and find a match as the SRC port, DST IP/prefix and DST port entries matching criteria in row 630 are all wildcards the received data packet from SBC-C 108 will meet the matching criteria for the packet. With the matching criteria met the SDN switch will perform the action described in column 614, row 630 when the flow entry has the highest priority/preference of matching flow entries in the table. The action that is then performed by the SDN switch is that no rewriting the source or destination IP address/port information is to be performed on the received SBC egress packet's packet header. Instead the SDN switch will output the received packet with the same source and destination IP/port included in the packet received from the SBC-C 108 and will output the packet to the external network as identified in column 616, row 630. In this way, the local egress IP address and port that a peer device receives in egress SIP messages sent from the SBC-C 108 will include the SBC's egress IP address and port information. The SBC-C 108 egress IP address and port will not be modified. The cluster of SBCs will not use a shared egress IP address but instead each SBC of the cluster uses its own egress IP address.

Additionally, the SBC leader also installs an inbound default path to itself for all SIP signaling. In this example, SBC-B 106 is chosen/elected as the SBC leader, and the SIP signaling port number is 5060 being used for the ingress SIP signaling port. The SBC-B 106 sends control information to the SDN network controller 116 which causes the SDN network controller to install a table flow entry in the SDN switches of the SDN network so that by default they route inbound SIP signaling messages to the SBC-B leader.

The entry (column 602, row 632) states "TAG10," as the entries in row 632 specify a flow table entry 10. The information contained in row 632 is flow table entry installed for group/cluster leader SBC-B 106 with a flow table entry identifier of TAG10 (column 602, row 632), priority/preference of 1 (column 604, row 632), matching criteria Source IP address/prefix of 0/0 (column 606, row 632), matching criteria source port number of * indicating a wildcard (column 608, row 632), matching criteria of destination IP address/prefix of IP-0/32 which is the ingress shared SBC cluster IP address (column 610, row 632), matching criteria of destination port number of 5060 (column 612, row 632), action of "DST IP<--" which instructs the SDN switch to rewrite the destination address in received packets that match the table entry with the SBC-B 106 ingress IP address IP-2 when the action is to be executed (column 614, row 630), and output port (column 616, row 632) with entry of "to-SBC-B" indicating that the received packet is to be outputted to SBC-B from the SDN switch output port that is connected to the internal SDN network (column 616, row 632). The TAG10 table entry ensures that packets received at the SDN switch with any source IP address and port number and a destination IP address of IP-0/32 and port 5060 (that is a destination IP address and port matching the SBC cluster's shared ingress IP address and port of IP-0, port number 5060) will have the destination IP address rewritten to be the ingress IP address for the SBC leader of the cluster which is SBC-B 106 with IP address IP-2 when the table's priority entry of 2 is the highest matching table entry priority. When a SDN switch with this table entry receives a packet e.g., from a peer, the SDN switch will match received packet header information against the table entries and will find a match when the destination port in the received packet header is 5060 and the destination IP address in the packet's header matches IP-0/32 entry which is the shared ingress SBC cluster IP address, the source port is wild carded so any entry will match and the source IP address is set to 0/0 so any entry will match. With the matching criteria met the SDN switch will perform the action described in column 614, row 632 when the flow entry has the highest priority/preference of matching flow entries in the table. The action that is then performed by the SDN switch is that the destination IP address is rewritten so that the destination IP address is IP-2 which is the destination ingress IP address for the SBC group leader SBC-B 106 and the SDN switch will output the packet with the rewritten header to its output port interfacing the SDN network to SBC-B 106 as identified in column 616, row 632. The table entry TAG 10 has a priority/precedence level of 1 which is lower priority than the table entries for TAG 01, 02, 03, 04, 05, and 06 which have a level 3 priority/precedence. As a result, if any received packet meets the matching criteria for table entry TAG 01, 02, 03, 04, 05 or 06, and the matching criteria for the table entry for TAG 10, the TAG 01, 02, 03, 04, 05 or 06 action will be performed as it has a higher priority than the TAG 10 entry.

With the table entries of table 700 now installed in the SDN switches each SIP request received from a previously unseen peer device will have the SIP request routed to the SBC group leader SBC-B 106 as all incoming SIP messages with a packet header of destination of IP-0 (shared SBC cluster ingress IP address) will be forwarded to the IP-2 address of the SBC-B 106 group leader where the SBC-B 106 group leader will determine based on the current load of the SBCs of the cluster which SBC of the cluster should handle the session and assign it to that SBC. This will now be explained in further detail by way of an example.

In the example, peer device 1 has IP address IP-11. Peer device 1 commences initiation of a VOIP call by sending a SIP INVITE message with addressing DST=IP-0/5060, SRC=IP-11/5060 to one of the SDN switches 110, 112, . . . , 114 of the SDN network 102. The peer device 1 has a previously unseen address IP-11, i.e., the IP-11 address does not appear in the flow table 600'. This means that no SBC in the SBC cluster has been assigned responsibility for handling session/call requests from peer 1 IP address IP-11. When the SIP INVITE packet arrives at the SDN switch, e.g., SDN switch 110, the SDN switches applies the matching criteria identified in each of the table entries 620, 622, 624, 626, 628, 630 and 632 to the SIP INVITE packet header contents. A match is made for the rule TAG 10 in table entry row 632. TAG 10 is the only table flow entry in table 600' that matches so it has the highest priority and action identified in TAG 10 rule is implemented by the SDN switch. The destination IP address is rewritten from IP-0 the shared ingress IP address for the SBC cluster to be the destination IP address IP-2 which is the ingress IP address for the SBC cluster leader SBC-B 106. The SIP INVITE packet with the rewritten address information (DST=IP-2/6050, SRC=IP-11/5060) is then forwarded out the appropriate port (port to SBC-B on the SDN network 102) to the SBC cluster leader, SBC-B 106. It should be noted that none of the contents of the SIP message are modified; only the SIP header information is modified, i.e., destination IP address. In particular, it should be noted that the "Request URI" (RURI) header and "To" header are not modified.

The SBC-B 106 leader receives the SIP INVITE packet with the rewritten header from the SDN switch, e.g., SDN switch 110 and determines based on the relative loading across the network which SBC of the cluster of SBCs should handle the SIP INVITE message. The SBC-B 106 leader can choose to either handle the call locally, i.e., assign the call to itself, or re-target the call to another SBC in the cluster, i.e., SBC-A 104 or SBC-C 108. For this example, SBC-B 106 determines that SBC-C 108 has the lightest load of the three SBCs in the cluster and is underutilized. SBC-C 108 then retargets the call to SBC-C 108. When SBC-C 108 receives the SIP INVITE request for the call, it checks whether it is currently handling calls from peer device 1 with address IP-11. If not, as is the present case, it adds a flow path to the SDN switches as part of the call handling by sending control information to the SDN controller 116 which installs a flow table entry that directs all future signaling sent from the peer device 1 address IP-11 to the shared SBC cluster ingress IP address IP-0 to be delivered to SBC-C 108.

Figure 8:
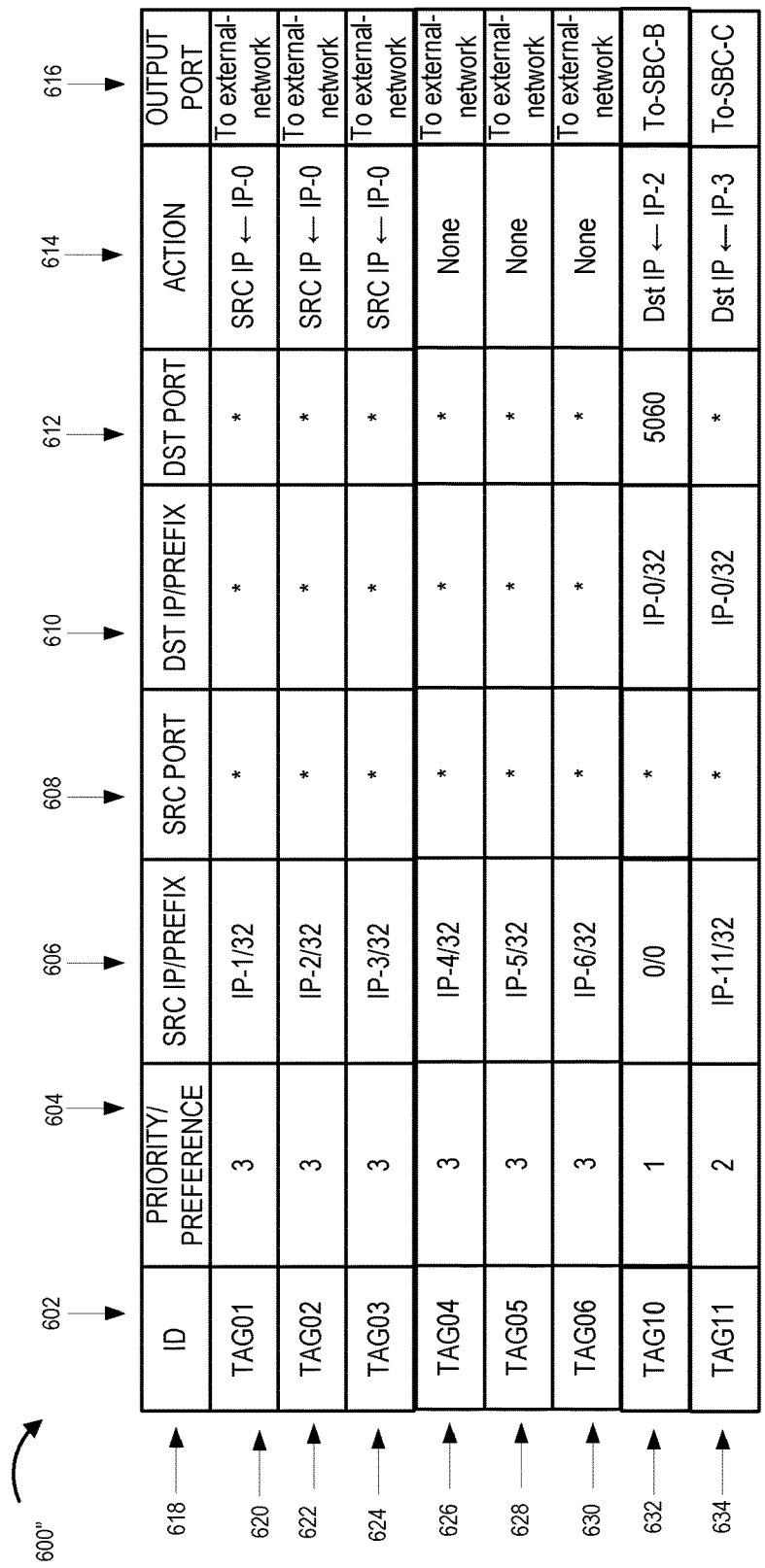
FIG. 8 illustrates table 600" which is table 600' augmented to include an additional exemplary SDN switch flow table entry rule in accordance with an embodiment of the present invention.

Table 600" row 634 shown in FIG. 8 includes the flow table entry rule installed by the SDN network controller 116 in the SDN switches of the SDN network 102 in response to receiving the control information from SBC-C 108.

The entry (column 602, row 634) states "TAG11," as the entries in row 634 specify a flow table entry 11 rule. The information contained in row 634 is flow table entry installed for SBC-C 108 with a flow table entry identifier of TAG11 (column 602, row 634), priority/preference of 2 (column 604, row 634), matching criteria Source IP address/prefix of IP-11/32 (column 606, row 634), matching criteria source port number of * indicating a wildcard (column 608, row 634), matching criteria of destination IP address/prefix of IP-0/32 (shared SBC cluster ingress IP address)(column 610, row 634), matching criteria of destination port number of * indicating a wildcard (column 612, row 634), action of DST IP<---IP-3 which instructs the SDN switch to replace the source IP address in received packets that match the table entry with the IP address of IP-3 (ingress IP address of SBC-C 108) when the action is to be executed (column 614, row 634), and output port (column 616, row 634) with entry of "To-SBC-C" indicating that the received packet is to be outputted to SBC-C 108 from the SDN switch output port that is connected to the SDN network 102 (column 616, row 634). The TAG11 table entry rewrites the destination IP address for received packets that have a source IP address that matches the peer 1 IP-11 address and a destination address matching the shared ingress SBC cluster IP address IP-0. When a SDN switch with this table entry receives a packet from peer 1 with an IP address IP-11 and destination address of IP-0, the SDN switch will match the source address and destination address in the both TAG 10 entry and TAG 11 entry but the TAG 11 entry has a priority/precedence value of 2 which is a higher priority than the TAG 10 entry of 1 and so the SDN switch will perform the action identified in the TAG 11 rule which is rewrite the destination address in the received packet header to IP-3 the ingress IP address of SBC-C 108, the SBC of the cluster assigned to handle calls and session from the IP address IP-11 by the SBC-B cluster leader 106.

With the set of flow rules shown in FIG. 8 table 600" in place, all future signaling sent by the peer 1 device with IP address IP-11 to the shared SBC cluster ingress IP address IP-0, will be delivered to SBC-C 108, and all signaling packets sent by the SBC-C to peer 1 device with IP address IP-11 will appear to come from source IP-0. Effectively, the peer will appear to be communicating to a single large logical SBC with SIP signaling address IP-0. It will be understood that in some embodiments, the SBC-C 108 switches its ingress IP address to IP-3 by providing that contact address in the call acceptance (e.g., SIP 200 response message). However, while SBC-C 108 could switch to using its ingress IP address IP-3 by providing that Contact address in the call acceptance, this is unnecessary given that the IP-0 to IP-3 switch mapping (TAG-10 rule) is in place, consequently, most embodiments will have SBC-C 108 continue using IP-0 as its ingress address throughout the handling of calls/sessions with the peer 1 device having IP address IP-11.

The (non-default) mapping rules (i.e., TAG01, 02, 03, 04, 05, 06 and 11 rules) are written in terms of the SBC interface address. Consequently, these rules will also work for the media component of the call. When negotiating the media for the call, SBC-C 108 will use IP-0 the SBC cluster shared ingress IP address as its local address for media. The SDN flow rules, e.g., OpenFlow rules, installed as described in table 600" will also ensure that the Real-time Transport Protocol (RTP) packet stream is properly mapped on both ingress and egress. Consequently, the SBC cluster will appear to be a single logical SBC with logical address IP-0 from a media perspective as well.

It should be noted that the "*" entry in the flow table entries illustrated in FIGS. 6, 7, and 8 can mean that the SDN switch is not to perform matching on the entry instead of performing a wildcard matching for any entry. In such embodiments, no processing is required for matching with respect to those table entries including a "*" making the SDN switch more efficient by reserving the SDN switch's processing capacity for other activities and enhancing the speed with which the SDN switch can process incoming packets.

While the above description of the exemplary embodiment summarizes the behavior at the highest levels, there are additional optimizations that can be associated with various embodiments of the invention which will now be discussed.

While the load balancing of ingress sessions/calls described in the exemplary embodiment occurs at a per-peer level, in some embodiments it is more efficient to implement the ingress load balancing by groups of peers. In some such embodiments, the flow rules installed are written using partially qualified peer IP addresses, with the mask determining the size of the group. That is the prefix including less bits than 32 bits for address matching of IPV4 IP address and less than 128 bits for IPV6 IP addresses. In some such embodiments, the system can be further extended to load balance by groups of peers but to fallback to individual overrides (with a fully qualified peer IP) for situations when a particular SBC handling a group is congested.

For certain deployments, special treatment of emergency calls may be needed requiring that they are successfully completed with as high probability as possible. To address such cases, in some embodiments, the SBC group/cluster leader is configured not to retarget the call, even if there are least loaded SBCs in the cluster than itself, as long as it can handle the call.

Under certain conditions, the SBC selected by the SBC cluster leader to handle a call is not in a position where it can handle an additional call, e.g. it gets overloaded/gets into a non-operative state due to a software bug after the last load report to the leader SBC. To address such situations, in some embodiments, the selected SBC sends the call back to the leader SBC if it still can do so. Alternatively, load information can be shared among all cluster members and the selected SBC can select/forward the call to another member. For certain implementations, an acknowledgement sent by the selected SBC upon receipt and successful processing of a call may be sent to the leader SBC. When such an acknowledgement is not received in a given (or configured) duration of time, the leader SBC can select a new SBC for the call.

The segregated signaling for ingress and egress calls is described as implemented using separate IP signaling addresses in each SBC. The addresses should be distinguishable at the SDN switches, e.g., OpenFlow Switches, matching function. Consequently, alternative means of distinguishing are possible. For example, the signaling for ingress and egress calls could use different transport port numbers, or different Differentiated Services Code Point (DSCP) markings. In such schemes, the flow entries in the SDN switches include the necessary additional key to ensure that IP address rewriting occurs for signaling associated with ingress calls and may not, and in some embodiments does not, occur with regard to IP addresses used for egress calls.

Another embodiment involves the lifetime associated with flows. Flows exist for the lifetime of a call but for efficiency, the lifetime may be extended. This extension can be time based or it can be indefinite with removals done, in some but not necessarily all embodiments, by Least Recently Used (LRU) only when resource utilization limits are reached. A separate variation of the present invention is actually a subset of this functionality. The various embodiments of the invention as described above are directed to, among other things, both load balancing and the use of a single logical IP appearance for inbound calls, i.e., the use of shared SBC cluster ingress IP address. For outbound calls (i.e., calls from within the cloud outbound), the load balancing function is achieved differently, but a single logical appearance is still desirable. Consequently, a subset of this functionality could be used for that the outbound direction.

In summary while there is general use of SDN for load balancing, the existing loading balancing schemes typically involve the SDN controller "picking" a target for flows that have no matching entry, and then installing an entry for that flow. These uncoupled or loosely coupled systems are satisfactory, even advantageous, for situations where the SDN can easily track the real load of the downstream devices. However, such existing load balancing schemes have disadvantages for VOIP applications as in most cases only the target systems have a true view of the load. Voice Over Internet Protocol (VOIP) applications involve long lived sessions and the dynamic creation/destruction of new flows (media) that are integrally coupled with other flows (signaling). In such situations, the target systems, but not other devices, have a true view of the load and are tightly integrated into the control of the load balancing function.

Various embodiments of the present invention address these and other technical problems of the existing method of load balancing in SDN system. The present invention is particularly suitable for use with cloud applications, e.g., cloud based SBC applications (e.g., cloud based SBCs providing VOIP services), without transactional independence with high performance load balancing requirements.

Figure 9:
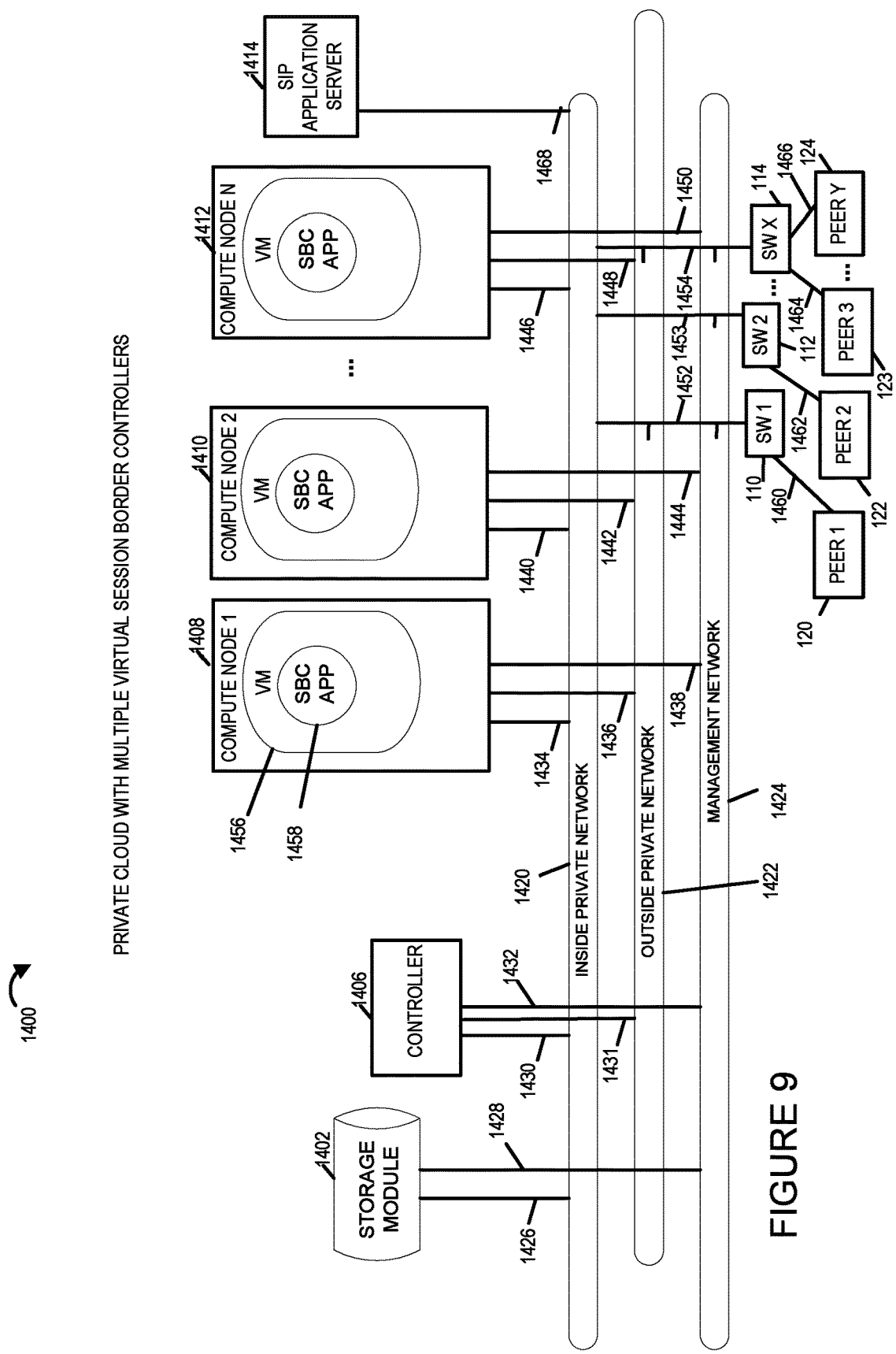
FIG. 9 illustrates an exemplary cloud system with multiple virtual session border controllers in accordance with an embodiment of the present invention.

FIG. 9 illustrates an exemplary private cloud system 1400 with multiple virtual session border controllers (SBCs) in accordance with an embodiment of the present invention. The exemplary cloud system 1400 shown is a private cloud but the system may be, and in many embodiments is, implemented in a public cloud. The system includes physical hardware resources including computing, storage, and network that provide processing, storage and connectivity which will be described in further detail below. The computing hardware includes one or more processors and commercial off the shelf (COTS) hardware that is commonly pooled. In some embodiments, the computing hardware is specialized and configured for use as session border controllers.

The system includes a storage module 1402, a controller 1406, a plurality of compute nodes, an optional SIP application server 1414, a SIP peer device 1 120, SIP peer device 2 122, SIP peer device 3 123, . . . , SIP peer device Y 124, SDN switch SW 1 110, SDN switch 2 112, . . . , SDN switch X 114, an inside private communications network 1420, an outside private communications network 1422, a management network 1424, and a plurality of communications links 1426, 1428, 1430, 1431, 1432, 1434, 1436, 1438, 1440, 1442, 1444, 1446, 1448, 1450, 1452, 1453, 1454, 1460, 1462, 1464, . . . , 1466, and 1468. The inside private communications network 1420, the outside private communications network 1422, the management network 1424, and the plurality of communications links 1426, 1428, 1430, 1431, 1432, 1434, 1436, 1438, 1440, 1442, 1444, 1446, 1448, 1450, 1452, 1454, 1460, 1462, 1464, . . . , 1466 and 1468 are used to exchange messages, information and instructions between the various devices, endpoints, nodes and entities in the system.

The plurality of compute nodes includes a compute node 1 1408, a compute node 2 1410, . . . , a compute node N 1412 where N is a positive number. The compute node 1 includes a virtual machine 1456 and a session border controller (SBC) application 1458. A compute node running a session border controller application, e.g., SBC APP 1458, is a virtualized session border controller. Each of the compute nodes 2 1410, . . . , N 1412 include a virtual machine and a SBC application. The plurality of compute nodes 1 . . . N executing software instructions to operate as a session border controller form a cluster of N computing devices or SIP processing devices. When N=5, it forms a cluster of five virtual session border controllers. The resources, e.g., SIP processing capabilities, available to each of the virtual session border controllers may be, and typically is, different, for example based on how the virtual SBC is configured. The compute node 1 1408 is coupled to: the inside private network 1420 via communication link 1434, the outside private network 1422 via communications link 1436, and the management network 1424 via communications link 1438. The communications node 2 1410 is coupled to: the inside private network 1420 via communication link 1440, the outside private network 1422 via communications link 1442, and the management network 1424 via communications link 1444. The communications node N 1412 is coupled to: the inside private network 1420 via communication link 1446, the outside private network 1422 via communications link 1448, and the management network 1424 via communications link 1450.

The storage module 1402 is a storage device, e.g., memory, for storing instructions, information and data. The storage module 1402 is coupled to the inside private network 1420 via communications link 1426 and to the management network 1424 via communications network 1428.

The controller 1406 is an SDN controller that operates to configure and manage the private cloud system. The controller 1406 is coupled to the inside private network 1420 via communications link 1430, the outside private network 1422 via communications link 1431, and the management network 1424 via communications link 1432. In some embodiments, the controller includes an orchestrator device or module, a Virtual Network Function manager device or module, and an element management system device or module. The orchestrator controls the orchestration and management of network function virtualized infrastructure and software resources, and realizing network services on network function virtualized infrastructure. The Virtual Network Function manager device or module operates to control virtual network function lifecycle management including for example instantiation, update, query and termination. A virtual network function as described in the ETSI GS NFV 002 V1.1.1 is a virtualisation of a network function. In this example, the virtualized network functions are session border controllers. The element management system or module performs management functions for one or several of the virtual network functions, e.g., virtual SBCs. Each compute node includes one or more processors. In some embodiments, one or more of the compute nodes in the system include a single processor upon which multiple virtual SBCs of the cluster are instantiated. In some embodiments, each virtual SBC of the cluster is a set of programming instructions forming a SBC application which is executed on a processor of a compute node.

The SIP application server 1414 is coupled to the inside private network 4120 via communications link 1468.

The SDN switch SW 1 110 is coupled to the inside private network 1420, the outside private network 1422, and the management network 1424 via communications link 1452. The SDN switch 2 112 is coupled to the inside private network 1420, the outside private network 1422, and the management network 1424 via communications link 1453. The SDN switch X 114 is coupled to the inside private network 1420, the outside private network 1422, and the management network 1424 via communications link 1454. Devices, elements and/or items shown in different Figures identified by the same number are to be considered the same or similar and having the same or similar functionality. For example, the SDN switches SW 1 110, SW2 112, . . . , SW X 114 and peer devices 1 120, peer device 2 122, peer device 3 123, . . . , peer device Y are to be considered the same as or similar to the SDN switches and peer devices having the same numbers as illustrated in FIG. 1 and will not be described in further detail in connection with FIG. 9.

In some embodiments, the system 1400 also includes a DNS server.

The methods and steps described in connection with the SBCs, SDN controller and SDN switches of the various embodiments described herein may be, and sometimes are, implemented on the private cloud system 1400 of FIG. 9. In some such embodiments, instead of a private cloud system a public cloud system is employed.

Figures 11, 11A, 11B, 11C, 11D:
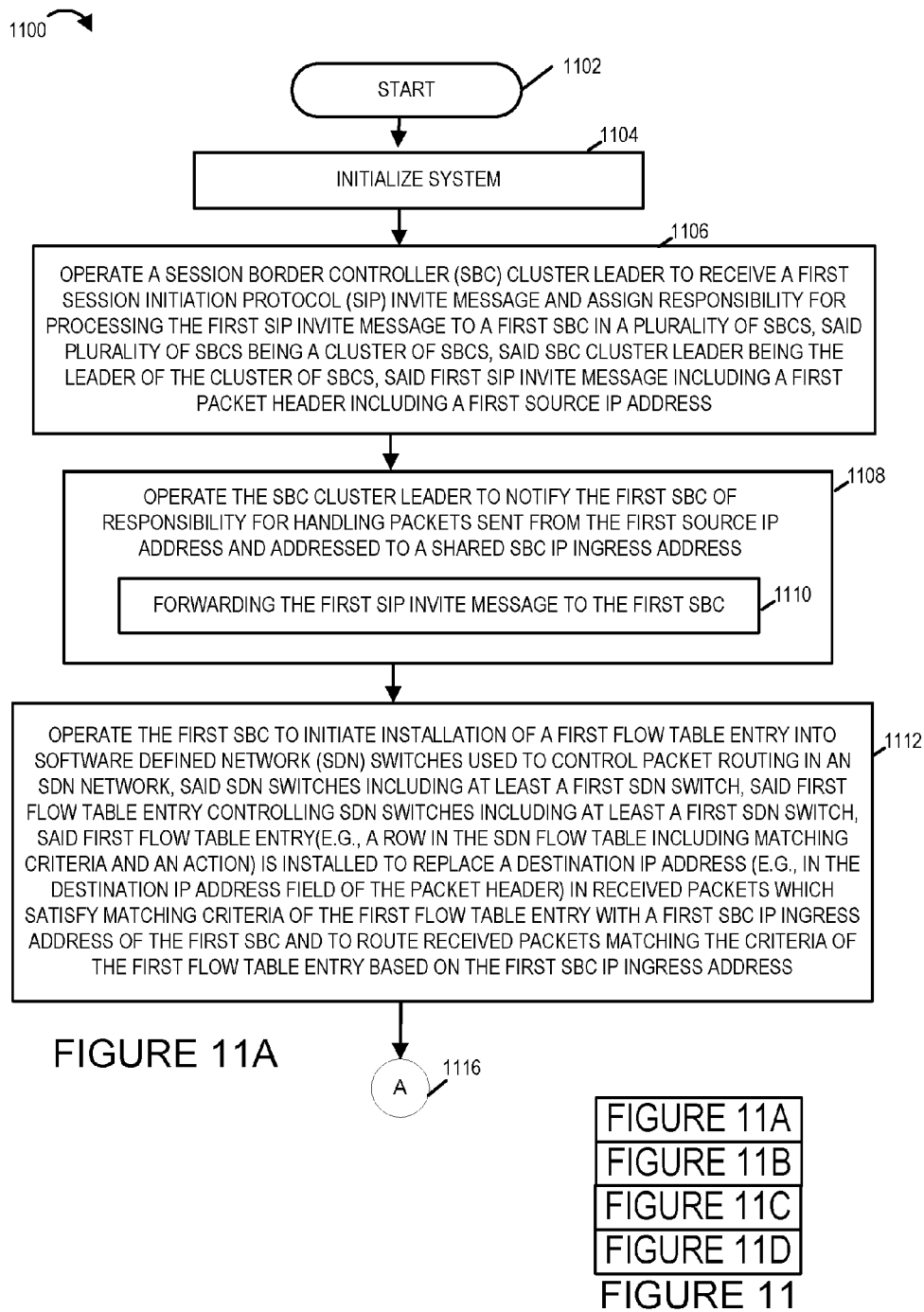
FIG. 11 illustrates the combination of FIGS. 11A, 11B, 11C, and 11D.
FIG. 11A illustrates a first part of a flowchart showing the steps of an exemplary communications method in accordance with one embodiment of the present invention.
FIG. 11B illustrates a second part of a flowchart showing the steps of the exemplary communications method in accordance with one embodiment of the present invention.
FIG. 11C illustrates a second part of a flowchart showing the steps of the exemplary communications method in accordance with one embodiment of the present invention.
FIG. 11D illustrates a second part of a flowchart showing the steps of the exemplary communications method in accordance with one embodiment of the present invention.
Figure 11B:
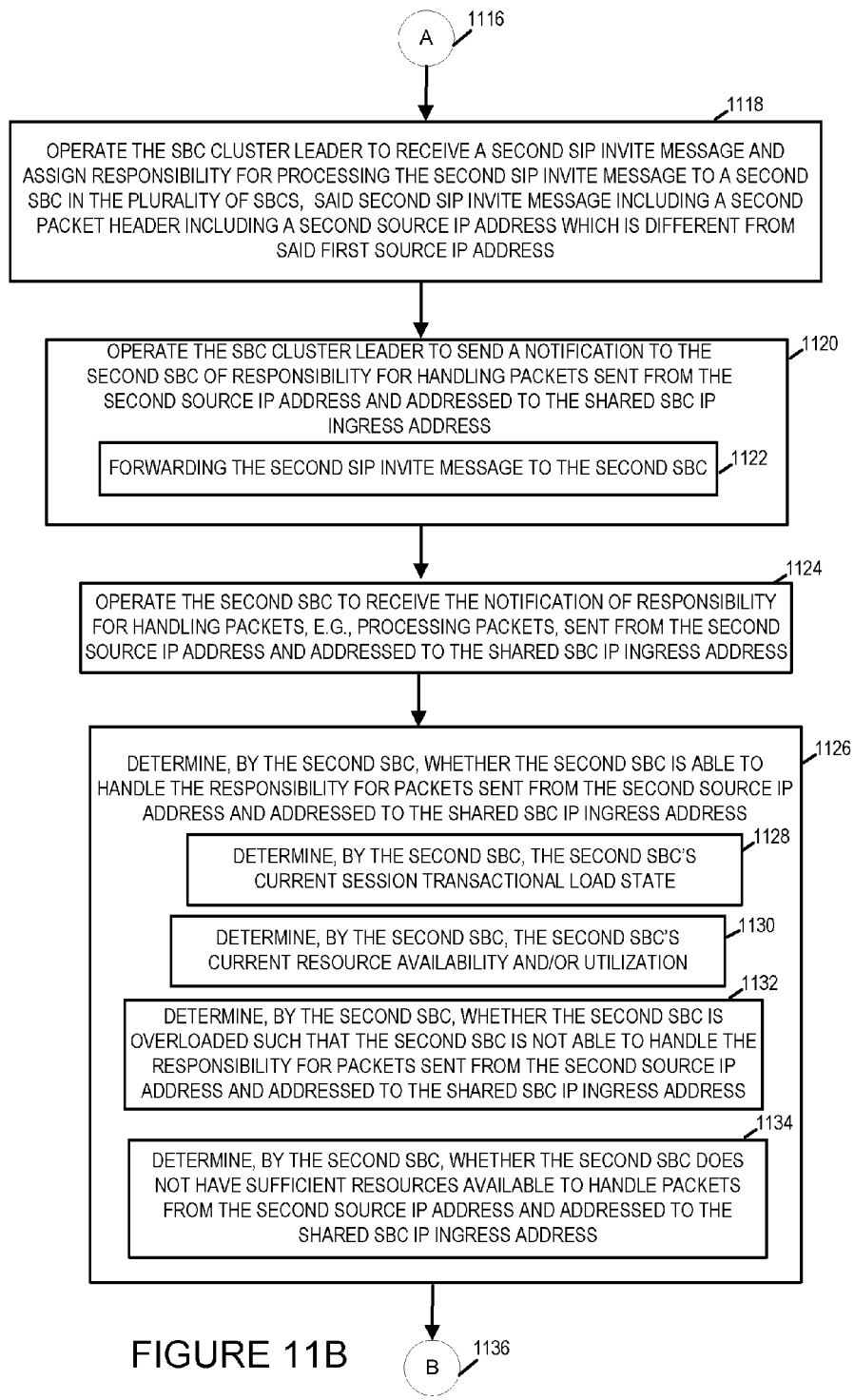
Figure 11D:
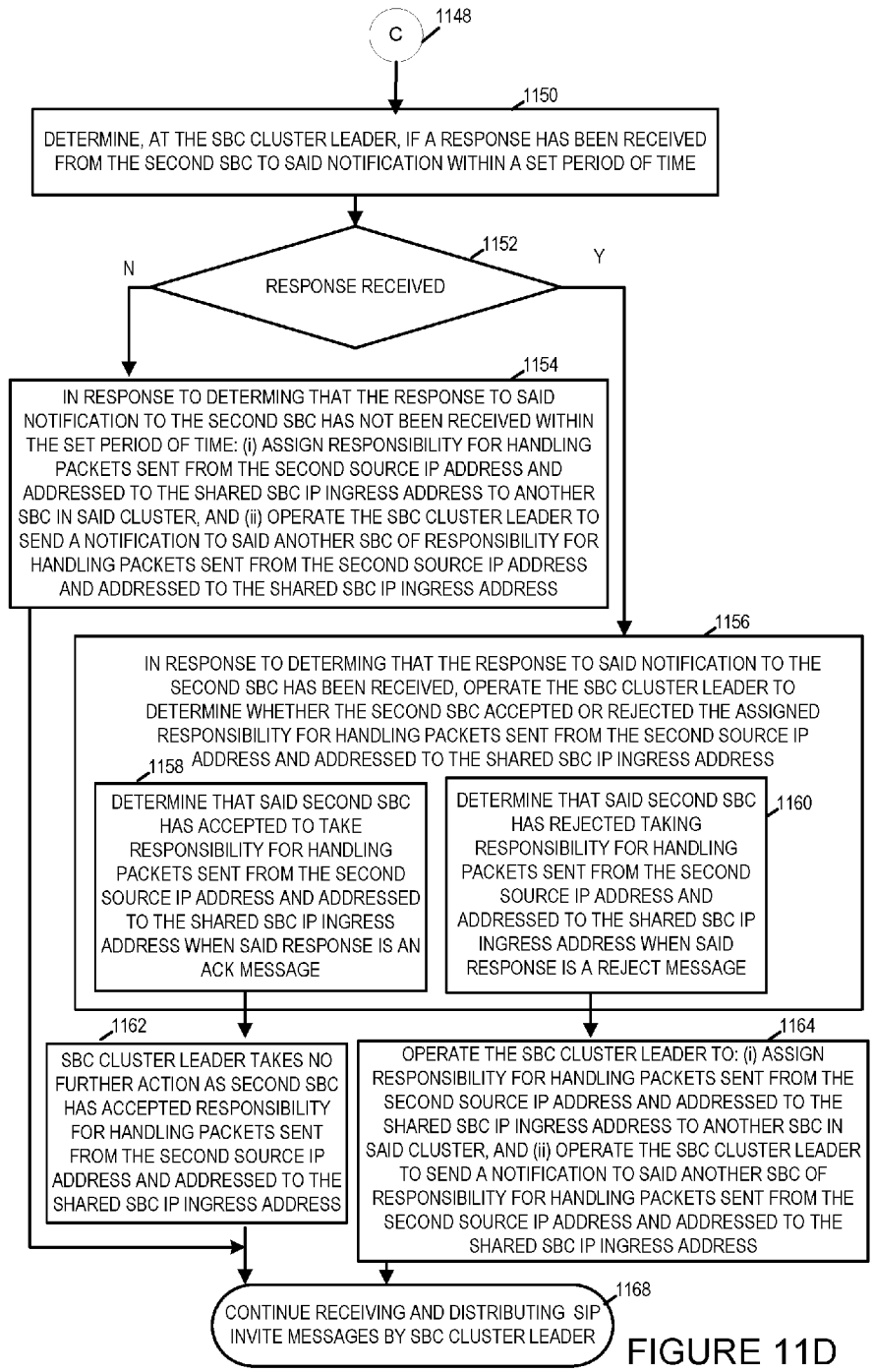

FIG. 11 comprises the combination of FIGS. 11A, 11B, 11C, and 11D. FIG. 11A illustrates a first part of a flowchart of an exemplary method in accordance with an embodiment of the present invention. FIG. 11B illustrates a second part of a flowchart of an exemplary method in accordance with an embodiment of the present invention. FIG. 11C illustrates a third part of a flowchart of an exemplary method in accordance with an embodiment of the present invention. FIG. 11D illustrates a fourth part of a flowchart of an exemplary method in accordance with an embodiment of the present invention. The steps of method 1100 illustrated in FIG. 11 may be, and in some embodiments are, implemented on devices illustrated in the systems of FIGS. 1 and 9. The exemplary method 1100 will now be explained in connection with exemplary system 100 though it should be understand that system 100 is only used for explanatory purposes and that the method 1100 may be implemented on other devices and in other systems such as for example system 1400 illustrated in FIG. 9. As discussed above in connection with OpenFlow switches, the SDN switches of system 100 and those described in connection with the methods 1100 and 1200 described below operate using flow table entries which include matching criteria, priority level, and actions. The priority of the flow table entry controls the precedence of the flow table entry when the matching criteria of multiple flow entries are satisfied by a received packet. The SDN switch performs only the actions required by the matching table entry with the highest priority.

The method 1100 begins at start step 1102 shown on FIG. 11A. Operation proceeds from start step 1102 to step 1104.

In step 1104, the system is initialized. An exemplary initialize routine/method 1200 which may be called in step 1104 is illustrated in FIG. 12 and explained in greater detail below. Once the system has been initialized, operation proceeds from step 1104 to step 1106.

In step 1106, a session border controller (SBC) cluster leader is operated to receive a first session initiation protocol (SIP) INVITE message and assign responsibility for processing the first SIP INVITE message to a first SBC in a plurality of SBCs, the plurality of SBCs being a cluster of session border controllers, the SBC cluster leader being a leader of the cluster of SBCs. The first SIP INVITE message includes a packet header including a first source IP (Internet Protocol) address. The first source IP address in the packet header may be a IPV4 or IPV6 packet header. Operation proceeds from step 1106 to step 1108.

In step 1108, the SBC cluster leader is operated to notify the first SBC of responsibility for handling packets sent from the first source IP address and addressed to a shared SBC IP ingress address, the shared SBC IP ingress address being an ingress IP address shared by the SBCs of the cluster. The shared SBC IP ingress address is an actual IP address but it logically shared by the SBCs of the cluster. The shared SBC IP ingress address is therefore a logical IP address. Being addressed to the shared SBC IP ingress address means that the packet header includes an IP destination address that is the shared SBC IP ingress address, the IP destination address being an IPV4 or IPV6 Internet Protocol address. The SBC cluster leader typically sends a notification message to the first SBC. In some embodiments, the SBC cluster leader sends the first source IP address of the received packet header. In some, but not all embodiments, the step 1108 of operating the SBC cluster leader to notify the first SBC includes the sub-step 1110. In sub-step 1110, the SBC cluster leader is operated to forward the first SIP INVITE message to the first SBC. Operation proceeds from step 1108 to step 1112.

In step 1112, the first SBC is operated to initiate installation of a first flow table entry into software defined network (SDN) switches used to control packet routing in an SDN network. The SDN switches including at least a first SDN switch, the first flow table entry controlling the SDN switches including at least a first SDN switch. The first flow table entry (e.g., a row in the SDN flow table including matching criteria and an action) is installed to replace a destination IP address (e.g., in the destination IP address field of the packet header such as the IPV4 or IPV6 IP destination address field) in received packets which satisfy matching criteria of the first flow table entry with a first SBC IP ingress address of the first SBC and to route received packets matching the criteria of the first flow table entry based on the first SBC IP Ingress address. The matching criteria of the first flow table entry including a packet header source IP address which matches the first source IP address and a packet header destination IP address which matches the shared SBC IP ingress address, the first flow table entry also including a first priority or preference value, the first priority or preference value being higher than the priority or preference value included with the default table entry discussed in connection with step 1208 of the initialization method 1200. In some embodiments, the first SBC installs the first flow table entry in SDN switches via a SDN controller. In some embodiments, the first SBC as part of being operated to initiate installation of the first flow table sends control information to a SDN controller requesting and/or instructing the SDN controller install the first flow table in SDN switches of the SDN network. The SDN controller after receiving the request and/or instructions generates the first flow table entry from the control information and installs the first flow table entry into SDN switches of the SDN controller via instructions sent to the SDN switches. In some embodiments in which the SDN switches are OpenFlow switches, the SDN controller communicates and installs the first flow table entry into the SDN switches using the OpenFlow protocol. Operation proceeds from step 1112 to step 1118 shown on FIG. 11B via connection node A 1116.

In step 1118, the SBC cluster leader is operated to receive a second SIP INVITE message and assign responsibility for processing the second SIP INVITE message to a second SBC in the plurality of SBCs, the second SIP INVITE message including a second packet header including a second source IP address which is different from the first source IP address. Operation proceeds from step 1118 to step 1120.

The SBC cluster leader typically sends a notification message including the second source IP address to the second SBC. In step 1120, the SBC cluster leader is operated to send a notification, e.g., a notification message, to the second SBC of responsibility for handling packets sent from the second source IP address and addressed to the shared SBC IP ingress address. In some, but not all embodiments, the step 1120 of operating the SBC cluster leader to notify the second SBC includes the sub-step 1122. In sub-step 1122, the SBC cluster leader is operated to forward the second SIP INVITE message to the second SBC. Operation proceeds from step 1120 to step 1124.

In step 1124, the second SBC is operated to receive the notification of responsibility for handling packets, e.g., processing packets, sent from the second source IP address and addressed to the shared SBC IP ingress address. Operation proceeds from step 1124 to step 1126.

In step 1126, the second SBC determines whether the second SBC is able to handle the responsibility for packets sent from the second source IP address and addressed to the shared SBC IP ingress address. In some embodiments, step 1126 includes one or more sub-steps 1128, 1130, 1132 or 1134.

In sub-step 1128, the second SBC is operated to determine the second SBC's current session transactional load state. In sub-step 1130, the second SBC is operated to determine the second SBC's current resource availability and/or resource utilization. In sub-step 1132, the second SBC is operated to determine whether the second SBC is overloaded such that the second SBC is not able to handle the responsibility for packets sent from the second source IP address and addressed to the shared SBC IP ingress address. In sub-step 1134, the second SBC is operated to determine whether the second SBC does not have sufficient resources available to handle responsibility for packets sent from the second source IP address to the SBC IP ingress address such as for example processing of session requests, establishing signaling and media sessions, establishing call sessions, performing transcoding functionality in response to requests sent from the second IP address to the SBC IP ingress address. Operation proceeds from step 1126 to decision step 1136 shown on FIG. 11C via connection node 1136.

In decision step 1138 if the second SBC has been determined to be able to handle the assigned responsibility, operation proceeds to step 1142. In decision step 1138 if the second SBC has determined that it is not able to handle the assigned responsibility, operation proceeds to step 1140.

In step 1140, the second SBC is operated so that it does not respond to the notification received from the SBC cluster leader or sends a response rejecting responsibility for handling of packets sent from the second source IP address and addressed to the shared SBC IP ingress address. In most embodiments, the second SBC does not send a response when it has determined that it is not able to handle the assigned responsibility. In such embodiments, this reduces additional processing on the second SBC device which may be overloaded. Operation proceeds from step 1140 to step 1146.

Returning to the situation in which the second SBC has decided that it is able to handle the assigned responsibility in decision step 1138, processing proceeds to step 1142 as mentioned above. In step 1142, the second SBC is operated to respond to the received notification of responsibility for handling packets sent from the second source IP address and addressed to the shared SBC IP ingress address by (i) sending an acknowledgement to the SBC cluster leader, and (ii) initiating installation of a second flow table entry into SDN switches used to control packet routing in the SDN network. The second flow table entry controlling SDN switches into which the second flow table entry is installed to replace a destination IP address (e.g., in the IP destination field of the packet header, e.g., IPV4 or IPV6 destination field) in received packets, which satisfy matching criteria of the second flow table entry, with a second SBC IP ingress address of the second SBC and to route received packets satisfying the matching criteria of the second flow table entry based on the second SBC IP ingress address, the matching criteria of the second flow table entry including a packet header source IP address which matches the second source IP address and a packet header destination IP address which matches the shared SBC IP ingress address. Operation proceeds from step 1142 to step 1144.

In step 1144, the second SBC is operated to send a SIP 200 OK response message to the second source IP address in response to the second SIP INVITE message. Operation proceeds from step 1144 to step 1146.

In step 1146, the SBC cluster leader is operated to monitor for a response from the second SBC to the notification sent to the second SBC. Operation proceeds from step 1146 to step 1150 shown in FIG. 11D via connection node C 1148.

In step 1150, the SBC cluster leader determines if a response has been received from the second SBC to the notification sent to the second SBC within a set period of time. Operation proceeds from step 1150 to decision step 1152.

In decision step 1152, if the SBC cluster leader determines in step 1150 that a response to the notification was received from the second SBC within the set period of time then operation proceeds from step 1152 to step 1156. In decision step 1152, if the SBC cluster leader determines in step 1150 that a response was not received from the second SBC to the notification within the set period of time then processing proceeds to step 1154.

In step 1154, in response to determining that the response to said notification to the second SBC has not been received within the set period of time the SBC cluster leader is operated to perform the following tasks: (i) assign responsibility for handling packets sent from the second source IP address and addressed to the shared SBC IP ingress address to another SBC in the cluster, and (ii) operate the SBC cluster leader to send a notification to the another SBC of responsibility for handling packets sent from the second source IP address and addressed to the shared SBC IP ingress address. Operation proceeds from step to 1154 to step 1168.

As previously mentioned when in step 1152 the SBC cluster leader decision is that a response to the notification to the second SBC was received from the second SBC within the set period of time, operation proceeds from decision step 1152 to step 1156.

In step 1156 in response to determining that the response to said notification to the second SBC has been received, operate the SBC cluster leader to determine whether the second SBC accepted or rejected the assigned responsibility for handling packets sent from the second source IP address and addressed to the shared SBC IP ingress address (i.e., packet header IP destination address is the shared SBC IP ingress address).

In sub-step 1160, it is determined that the second SBC has rejected taking responsibility for handling packets sent from the second source IP and addressed to the shared SBC IP ingress address when said response is or contains a rejection message. Operation proceeds from sub-step 1160 of step 1156 to step 1164.

In step 1164, the SBC cluster leader is operated to: (i) assign responsibility for handling packets sent from the second source IP address and addressed to the shared SBC IP ingress address to another SBC in said cluster of SBCs, and (ii) send a notification to the another SBC of responsibility for handling packets sent from the second source IP address and addressed to the shared SBC IP ingress address. Operation proceeds from step 1164 to step 1168.

In sub-step 1158 it is determined that said second SBC has accepted responsibility for handling packets sent form the second source IP address and addressed to the shared SBC IP ingress address when the response is an ACK (acknowledgement) message. Operation proceeds from sub-step 1158 of step 1156 to step 1162.

In step 1162, the SBC cluster leader takes no further action as the second SBC has accepted responsibility for handling packets sent from the second source IP address and addressed to the shared SBC IP ingress address. Step 1162 is a bypass step in which operation proceeds from step 1156 to step 1168 bypassing step 1164.

In step 1168, operation continues with the SBC cluster leader receiving and distributing SIP INVITE messages to SBCs in the cluster.

Reference to source IP addresses in packet headers refers to the IP address included in the IPV4 packet header source field. References to received packets addressed to an IP address refer to a packet including a packet header with the IP address included in the IPV4 destination address field. While the IP addresses discussed in the exemplary embodiment of FIG. 11 are IPV4 addresses, the exemplary embodiment also works with IPV6 IP addresses. In such cases the IP addresses references are IPV6 addresses as opposed to IPV4 IP addresses. The present invention works with both IPV4 and IPV6 IP addresses.

In some embodiments, each of the SBCs of the cluster asynchronously generate session transaction load state information on a recurring basis reflecting its current session transaction load state and transmit to or make available to the SBC cluster leader the generated session transaction load state information, the SBC cluster leader receiving on a recurring basis the generated session transaction load state information from each of the SBCs and maintaining the received session transaction load state information for each of the SBCs of the cluster in a data record. In some of such embodiments, the SBC cluster leader assigns responsibility for processing received SIP Invite messages based on the session transaction load state information maintained on each of the SBCs of the cluster. In some embodiments, the SBC cluster leader assigns responsibility for processing received SIP Invite messages amongst the SBCs of the cluster using a round robin distribution method and without basing said assignment on the SBCs transactional load state.

In some embodiments, the SBC leader determines if the SIP Invite message is for an emergency call prior to assigning responsibility for processing the call to an SBC and first determines whether it can process the call and if it can it processes the call instead of assigning responsibility for processing the received SIP Invite message based on session transaction load state of the SBCs of the cluster thereby not introducing any additional delay into processing of emergency calls.

In some embodiments instead of the SBC cluster leader forwarding the received SIP Invite message to the SBC assigned to handle the processing of messages from the source IP address, the SBC cluster leader retargets the SIP Invite message to the assigned SBC by sending a SIP 3XX redirection message after receiving notification from the assigned SBC that it will accept the assigned responsibility and has caused to be installed in the SDN switches the appropriate flow table entry so that the SDN switches will route messages received from the IP source address and addressed the shared SBC IP ingress address and port to the assigned SBC.

Figure 12B:
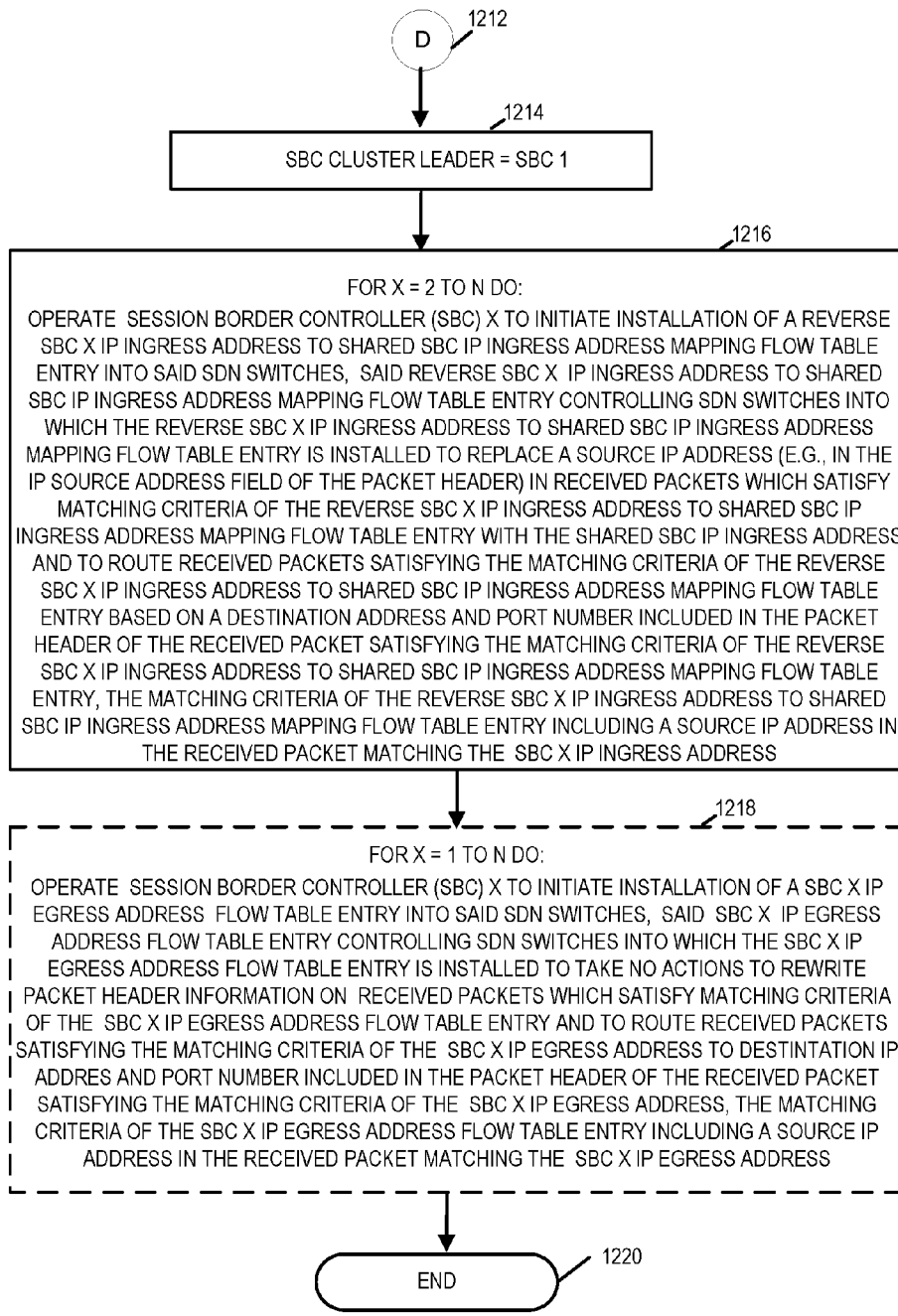
FIG. 12B illustrates a second part of a flowchart showing the steps of the exemplary system initialization method in accordance with one embodiment of the present invention.

FIG. 12 comprises the combination of FIGS. 12A and 12B, 11C. FIG. 12A illustrates a first part of a flowchart of an exemplary method in accordance with an embodiment of the present invention. FIG. 12B illustrates a second part of a flowchart of an exemplary method in accordance with an embodiment of the present invention. The steps of method 1200 illustrated in FIG. 12 may be, and in some embodiments are, implemented on devices illustrated in the systems of FIGS. 1 and 9. The exemplary method 1200 will now be explained in connection with exemplary system 100 though it should be understand that system 100 is only used for explanatory purposes and that the method 1200 may be implemented on other devices and in other systems such as for example system 1400 illustrated in FIG. 9.

The exemplary method 1200 is an initialization method in which various components of the system are initialized. As previously mentioned, the initialization method 1200 is sometimes implemented as subroutine and is called from a main routine or method such as method 1100. Initialization step 1104 illustrated in method 1100 in some embodiments calls or performs operations included in method 1200.

The initialization method 1200 begins in start step 1202. Operation proceeds from step 1202 to step 1204.

In step 1204, a cluster of session border controllers (SBCs) is formed from a plurality of N SBCs in a Software Defined Network (N being a positive number, e.g., N=3). Operation proceeds from step 1204 to step 1206.

In step 1206 a SBC cluster leader is selected from the plurality of session border controllers. Operation proceeds from step 1206 to step 1208.

In step 1208, the Session Border Controller (SBC) cluster leader is operated to initiate installation of a default flow table entry in SDN switches that controls the SDN switches that include the default flow table entry to replace a destination IP address (e.g., in the IP destination address field of a packet header) in received packets which satisfy matching criteria of the default flow table entry with an ingress IP address of the SBC cluster leader and to route received packets satisfying the matching criteria of the default flow table entry based on the IP ingress address of the SBC cluster leader, the matching criteria of the default flow table entry being an IP destination address in a received packet header matching the shared SBC IP ingress address and a destination port number that matches a specified port number, e.g., a port number used for SIP signaling messages by the SBC cluster leader, the default flow table entry including a priority or precedence value, the default flow table entry having a lower priority/precedence than the first flow table entry previously discussed in connection with step 1112. Operation proceeds from step 1208 to step 1210.

In step 1210, the session border controller cluster leader is operated to initiate installation of a reverse SBC cluster leader IP ingress address to shared SBC IP ingress address mapping flow table entry into the SDN switches, the reverse SBC cluster leader IP ingress address to shared IP ingress address mapping flow table entry controlling SDN switches into which the reverse SBC cluster leader IP ingress address to shared SBC IP ingress address mapping flow table entry is installed to replace a source IP address (e.g., in the IP source address filed of the packet header) in received packets which satisfy matching criteria of the reverse SBC cluster leader IP ingress address to shared SBC IP ingress address mapping flow table entry with the shared SBC IP ingress address and to route received packets satisfying the matching criteria of the reverse SBC cluster leader IP ingress address to shared SBC IP ingress address mapping flow table entry based on a destination address and port included in the packet header of the received packet satisfying the matching criteria of the reverse SBC cluster leader IP ingress address to shared SBC IP ingress address mapping flow table entry, the matching criteria of the reverse SBC cluster leader IP ingress address to shared SBC IP ingress address mapping flow table entry including a source IP address in the received packet matching the SBC cluster leader IP ingress address, the reverse SBC cluster leader IP ingress address to shared SBC IP ingress address mapping flow table entry having a priority or precedence value that is higher than the first flow table entry. Operation proceeds from step 1210 to step 1214 shown on FIG. 12B via connection node D 1212.

In step 1214, the SBC cluster leader=SBC 1. Operation proceeds from step 1214 to step 1216. In step 1216, a for loop is performed for X=2 To N, where as previously stated N is the number of the SBCs in the cluster. The for loop is used to initiate installation of a reverse SBC X IP ingress address to shared SBC IP ingress address mapping flow table entry into SDN switches for X=2 to N. In step 1214 SBC X (for X=2 to N) is operated to initiate installation of a reverse SBC X IP ingress address to shared SBC IP ingress address mapping flow table entry into SDN switches, the reverse SBC X IP ingress address to shared SBC IP ingress address mapping flow table entry controlling SDN switches into which the reverse SBC X IP ingress address to shared SBC IP ingress address mapping flow table entry is installed to replace a source IP address (e.g., in the IP source address field of the packet header) in received packets which satisfy matching criteria of the reverse SBC X IP ingress address to shared SBC IP ingress address mapping flow table entry with the shared SBC IP ingress address and to route receive packets satisfying the matching criteria of the SBC X ingress address to shared SBC IP ingress address mapping flow table entry based on a destination address and port number included in the packet header of the received packet satisfying the matching criteria of the reverse SBC X IP ingress address to shared SBC IP ingress address mapping flow table entry, the matching criteria of the reverse SBC X IP ingress address to shared SBC IP ingress address mapping flow table entry including a source IP address in the received packet matching the SBC X IP ingress address, the reverse SBC X IP ingress address to shared SBC IP ingress address mapping flow table entry having a priority or precedence value that is higher than the first flow table entry. X began at 2 instead of 1 because SBC 1 was the SBC cluster leader and step 1210 already installed a reverse SBC cluster leader IP ingress address to shared SBC IP ingress address mapping flow table entry into SDN switches. Operation proceeds from step 1216 to optional step 1218. In embodiments in which optional step 1218 is not performed operations proceeds to end step 1220.

In step 1218, a for loop is perform for X=1 to N. SBC X (for X=1 to N) is operated to initiate installation of a SBC X IP egress address flow table entry into said SDN switches, SBC X IP egress address flow table entry controlling SDN switches into which the SBC X IP egress address flow table entry is installed to take no actions to rewrite packet header information on received packets which satisfy matching criteria of the SBC X IP egress address flow table entry is installed and to route received packets satisfying the matching criteria of the SBC X IP egress address to the destination IP address and port number included in the packet header of the received packet satisfying the matching criteria of the SBC X IP egress address, the matching criteria of the SBC X IP egress address flow table entry including a source IP address in the received packet matching the SBC X IP egress address. SBC X IP egress address flow table entry has a higher priority than the default flow table entry priority or the first flow table entry priority. Operation proceeds from step 1218 to step 1220.

In end step 1220, the initialize method comes to an end. In instances in which the method 1200 is a routine or sub-routine called from a main method or routine, e.g., method 1100, processing operations return to the main method or routine.

Set forth below are various exemplary numbered embodiments. Each set of numbered exemplary embodiments is numbered by itself with embodiments in a set referring to previous numbered embodiments in the same set.

List of First Set of Exemplary Numbered Method Embodiments

Method Embodiment 1

A method of assigning responsibility for processing of Session Initiation Protocol (SIP) messages addressed to a shared SBC IP ingress address, the method comprising: operating a SBC cluster leader to receive a first SIP invite message and assign responsibility for processing the first SIP invite message to a first SBC in a plurality of SBCs, said plurality of SBCs being a cluster of SBCs, said SBC cluster leader being the leader of the cluster of SBCs, said first SIP invite message including a first SIP packet header including a first source IP address; and operating the first SBC to initiate installation of a first flow table entry into SDN switches used to control packet routing in an SDN network, said SDN switches including at least a first SDN switch, said first flow table entry controlling SDN switches into which the first flow table entry, e.g., row in the SDN routing table, is installed to replace a destination IP address, e.g., in the IP destination address field of the packet header, in received packets which satisfy matching criteria of the first flow table entry with a first SBC IP ingress address of the first SBC and to the route received packets matching the criteria of the first flow table entry based on the first SBC IP ingress address.

Method Embodiment 2

The method of method embodiment 1, wherein said matching criteria of the first flow table entry include: a packet header source IP address which matches the first source IP address and a packet header destination IP address which matches the shared SBC IP ingress address.

Method Embodiment 3

The method of method embodiment 1, further comprising: operating the SBC cluster leader to notify the first SBC of responsibility for handling packets sent from the first source IP address and addressed to the shared SBC IP ingress address, e.g., this is performed prior to the SBC initiating installation of the first flow table entry and triggers the initiation of installation of the first flow table entry.

Method Embodiment 4

The method of method embodiment 3, wherein operating the SBC cluster leader to notify the first SBC of responsibility for handling packets sent from the first source IP address and addressed to the shared SBC IP ingress address includes: forwarding the first SIP invite message to the first SBC.

Method Embodiment 5

The method of method embodiment 4, further comprising: operating the SBC cluster leader to receive a second SIP invite message and assign responsibility for processing the second SIP invite message to a second SBC in the plurality of SBCs, said second SIP invite message including a second SIP packet header including a second source IP address which is different from said first source IP address; and operating the SBC cluster leader to send a notification to the second SBC of responsibility for handling packets sent from the second source IP address and addressed to the shared SBC IP ingress address.

Method Embodiment 6

The method of method embodiment 5, further comprising: operating the SBC cluster leader to monitor for a response from the second SBC to said notification.

Method Embodiment 7

The method of method embodiment 6, further comprising: operate the second SBC to receive the notification of responsibility for handling packets sent from the second source IP address and addressed to the shared SBC IP ingress address; operate the second SBC to respond to the received notification of responsibility for handling packets sent from the second source IP address and addressed to the shared SBC ingress address by: i) sending an acknowledgement to said SBC cluster leader, and ii) initiating installation of a second flow table entry into SDN switches used to control packet routing in the SDN network, said second flow table entry controlling SDN switches into which the second flow table entry, e.g., second row in the SDN routing table, is installed to replace a destination IP address, e.g., in the destination field of the packet header, in received packets which satisfy matching criteria of the second flow table entry with a second SBC IP ingress address of the second SBC and to route received packets satisfying the matching criteria of the second flow table entry based on the second SBC IP ingress address.

Method Embodiment 8

The method of method embodiment 7, wherein said matching criteria of the second flow table entry include: a packet header source IP address which matches the second source IP address and a packet header destination IP address which matches the shared SBC IP ingress address.

Method Embodiment 9

The method of method embodiment 6, further comprising: determining, at the SBC cluster leader, if a response has been received from the second SBC to said notification within a set period of time; in response to determining that the response to said notification to the second SBC has not been received within the set period of time: i) assigning responsibility for handling packets sent from the second source IP address and addressed to the shared SBC ingress address to another SBC in said cluster, and ii) operating the SBC cluster leader to send a notification to said another SBC of responsibility for handling packets sent from the second source IP address and addressed to the shared SBC ingress address.

Method Embodiment 10

The method of method embodiment 1, further comprising: prior to operating the SBC cluster leader to receive the first SIP invite message, operating the SBC cluster leader to initiate installation of a default flow table entry that controls SDN switches that include the default flow table entry to replace a destination IP address, e.g., in the IP destination address field of the packet header, in received packets which satisfy matching criteria of the default flow table entry with an ingress address of the SBC cluster leader and to route received packets satisfying the matching criteria of the default flow table entry based on the IP ingress address of the SBC cluster leader.

Method Embodiment 11

The method of method embodiment 10, wherein the default flow table entry has a lower priority than the first flow table entry.

Method Embodiment 12

The method of method embodiment 11, wherein the matching criteria of the default flow table entry is an IP destination address in a received packet header matching the shared SBC IP ingress address and a destination port number that matches a specified port number, e.g. a port number used for SIP signaling messages.

Method Embodiment 13

The method of method embodiment 1, further comprising: prior to the SBC cluster leader receiving the first SIP invite message, initiating installation of a third flow table entry into said SDN switches, said third flow table entry controlling SDN switches into which the third flow table entry is installed to replace a source IP address, e.g., in the source field of the packet header, in received packets which satisfy matching criteria of the third flow table entry with the shared SBC IP ingress address and to route received packets satisfying the matching criteria of the third flow table entry based on a destination address and port number included in the packet header of the received packet satisfying the matching criteria of the third flow table entry.

Method Embodiment 14

The method of method embodiment 13, wherein the matching criteria of the third flow table entry includes a source IP address in the received packet matching the first SBC IP ingress address.

Method Embodiment 15

The method of method embodiment 14, wherein third flow table entry has a lower priority than the first flow table entry.

Method Embodiment 16

The method of method embodiment 15, wherein the priority of the flow table entry controls precedence of flow table entry when the matching criteria of multiple flow entries are satisfied by a received packet and wherein the SDN switch performs only the actions required by the matching table entry with the highest priority.

Method Embodiment 17

The method of method embodiment 1 further comprising: each of the SBCs of the cluster asynchronously generating session transaction load state information on a recurring basis reflecting its current session transaction load state; receiving, by the SBC cluster leader, on a recurring basis the generated session transaction load state information from each of the client SBCs; maintaining, by the group leader SBC, session transaction load information on each of the SBCs of the cluster of SBCs in a data record.

Method Embodiment 18

The method of method embodiment 17 further comprising: wherein said SBC cluster leader assigns responsibility for processing the first SIP Invite message to the first SBC based on the session transaction load state information maintained on each of the SBCs of the cluster by the SBC cluster leader.

Method Embodiment 19

The method of method embodiment 17 wherein said SBC cluster leader assigns responsibility for processing received SIP Invite messages based on session transaction load state information generated by the SBCs of the cluster.

Method Embodiment 20

The method of method embodiment 1 wherein said SBC cluster leader assigns responsibility for processing received SIP Invite messages amongst said SBCs of the cluster using a round robin distribution method and without basing said assignment on the SBCs transactional load state.

Method Embodiment 21

A method of self-directed distribution of incoming Session Initiation Protocol (SIP) session transactions among a plurality of Session Border Controllers (SBCs) in a Software Defined Network (SDN), the method comprising: forming a load balancing cluster of SBCs from said plurality of SBCs in said Software Defined Network to process incoming Session Initiation Protocol (SIP) sessions from a plurality of peer devices, said cluster of SBCs being networked together and connected outside the cluster to said plurality of peer devices via SDN switches, said SDN switches forming a single switching fabric providing connectivity between any SBC in the cluster of SBCs and any of said peer devices in said plurality of peer devices; selecting a SBC group leader from the plurality of SBCs forming the load balancing cluster of SBCs, the non-selected SBCs becoming clients of the group leader SBC, each of the SBCs of said cluster of SBCs having a unique ingress SIP signaling address; each of the SBCs of the cluster asynchronously generating session transaction load state information on a recurring basis reflecting its current session transaction load state; receiving, by the SBC group leader, on a recurring basis the generated session transaction load state information from each of the client SBCs; maintaining, by the group leader SBC, session transaction load state information on each of the SBCs of the group of SBCs in a data record; allocating a unique shared group ingress logical SIP signaling address to the group of SBCs; sending, by each SBC of the group of SBCs, control information to a SDN controller which controls the SDN switches, said control information causing said SDN controller to install a flow table entry in said SDN switches mapping the ingress local SIP signaling address of the SBC to the shared group ingress logical SIP signaling address, each of said flow table entries have a first priority level; sending, by the SBC group leader, to said SDN controller control information to install a default flow table entry in said SDN switches, said default flow table entry including a matching criteria and a default routing instruction to route all SIP signaling messages received from said peer devices to be directed to the SBC group leader SIP signaling address, said default flow table entry having a second priority level which takes does not take precedence over said first priority level flow table entries; receiving a session initiation request at a first SDN switch of the plurality of SDN switches from one of the peer devices not currently being serviced by the cluster of SBCs; determining, by the SDN switch, based on a source IP address of the received session initiation request and the default flow table entry that the received session initiation request is to be routed to the SBC group leader ingress SIP signaling address; routing, by the first SDN switch, the session initiation request to the SBC group leader; determining, by the SBC group leader which SBC of the group of SBCs should handle session transaction processing for the received session initiation request based on the session transaction load state information maintained by the SBC group leader; when the determination is that one of the client SBCs is to handle the session transaction processing for the received session initiation request: (i) retargeting, by the SBC group leader, the session initiation request to the determined client SBC, (ii) determining, by the determined client SBC, whether it is handling other session transactions for the peer device that sent the session initiation request and when said client SBC determines that it is not handling other session transactions for the peer device that sent the session initiation request sending control information to the SDN controller to install rules on the SDN switches via a flow table entry with a third priority level which takes precedence over flow table entries with a first and second priority level so that all future signaling sent by the peer device from which the session initiation request was received are forwarded to the determined client device and all signaling packets sent from the determined client SBC to the peer device that sent the session initiation request include as the source address the shared group ingress logical SIP signaling address; and when the determination is that the SBC group leader is to handle the session transaction processing for the received session initiation request sending control information to the SDN controller to install rules on the SDN switches via a flow table entry with a third priority level which takes precedence over flow table entries with a first and second priority level so that all future signaling sent by the peer device from which the session initiation request was received are forwarded to the SBC group leader and all signaling packets sent from the SBC group leader to the peer device that sent the session initiation request include as the source address the shared group ingress logical SIP signaling address.

List of First Set of Exemplary Numbered System Embodiments

System Embodiment 1

A communications system comprising: a SBC cluster leader including a first processor configured to control the operation of the SBC cluster leader to receive a first SIP invite message and assign responsibility for processing the first SIP invite message to a first SBC in a plurality of SBCs, said plurality of SBCs being a cluster of SBCs, said SBC cluster leader being the leader of the cluster of SBCs, said first SIP invite message including a first SIP packet header including a first source IP address; and the first SBC including a second processor configured to control the operation of the first SBC to initiate installation of a first flow table entry into SDN switches used to control packet routing in an SDN network, said SDN switches including at least a first SDN switch, said first flow table entry controlling SDN switches into which the first flow table entry, e.g., row in the SDN routing table, is installed to replace a destination IP address, e.g., in the IP destination address field of the packet header, in received packets which satisfy matching criteria of the first flow table entry with a first SBC IP ingress address of the first SBC and to the route received packets matching the criteria of the first flow table entry based on the first SBC IP ingress address.

System Embodiment 2

The communications system of system embodiment 1, wherein said matching criteria of the first flow table entry includes: a packet header source IP address which matches the first source IP address and a packet header destination IP address which matches the shared SBC IP ingress address.

System Embodiment 3

The communications system of system embodiment 1, wherein said first processor is further configured to control the operation of the SBC cluster leader to notify the first SBC of responsibility for handling packets sent from the first source IP address and addressed to the shared SBC IP ingress address, e.g., this is performed prior to the SBC initiating installation of the first flow table entry and triggers the initiation of installation of the first flow table entry.

System Embodiment 4

The communications system of system embodiment 3, wherein operating the SBC cluster leader to notify the first SBC of responsibility for handling packets sent from the first source IP address and addressed to the shared SBC IP ingress address includes the SBC cluster leader forwarding the first SIP invite message to the first SBC.

System Embodiment 5

The communications system of system embodiment 4, wherein said first processor is further configured to control the operation of the SBC cluster leader to: receive a second SIP invite message and assign responsibility for processing the second SIP invite message to a second SBC in the plurality of SBCs, said second SIP invite message including a second SIP packet header including a second source IP address which is different from said first source IP address; and send a notification to the second SBC of responsibility for handling packets sent from the second source IP address and addressed to the shared SBC IP ingress address.

System Embodiment 6

The communications system of system embodiment 5 wherein said first processor is further configured to control the operation of the SBC cluster leader to monitor for a response from the second SBC to said notification.

System Embodiment 7

The communications system of system embodiment 6, wherein the second SBC includes a processor configured to control the operation of second SBC to: receive the notification of responsibility for handling packets sent from the second source IP address and addressed to the shared SBC IP ingress address; and respond to the received notification of responsibility for handling packets sent from the second source IP address and addressed to the shared SBC IP ingress address by: i) sending an acknowledgement to said SBC cluster leader, and ii) initiating installation of a second flow table entry into SDN switches used to control packet routing in the SDN network, said second flow table entry controlling SDN switches into which the second flow table entry, e.g., second row in the SDN routing table, is installed to replace a destination IP address, e.g., in the destination field of the packet header, in received packets which satisfy matching criteria of the second flow table entry with a second SBC IP ingress address of the second SBC and to route received packets satisfying second matching criteria of the second flow table entry based on the second SBC IP ingress address.

System Embodiment 8

The communications system of system embodiment 7, wherein said matching criteria of the second flow table entry includes: a packet header source IP address which matches the second source IP address and a packet header destination IP address which matches the shared SBC IP ingress address.

System Embodiment 9

The communications system of system embodiment 6, wherein said first processor is further configured to control the operation of the SBC cluster leader to: determine, at the SBC cluster leader, if a response has been received from the second SBC to said notification within a set period of time; and in response to determining that the response to said notification to the second SBC has not been received within the set period of time: i) assign responsibility for handling packets sent from the second source IP address and addressed to the shared SBC ingress address to another SBC in said cluster; and ii) to send a notification to said another SBC of responsibility for handling packets sent from the second source IP address and addressed to the shared SBC ingress address.

System Embodiment 10

The communications system of system embodiment 1, wherein said first processor is further configured to control the operation of the SBC cluster leader to: to initiate installation of a default flow table entry that controls SDN switches that include the default flow table entry to replace a destination IP address, e.g., in the IP destination address field of the packet header, in received packets which satisfy matching criteria of the default flow table entry with an ingress address of the SBC cluster leader and to route received packets satisfying the matching criteria of the default flow table entry based on the ingress address of the SBC cluster leader prior to the SBC cluster leader being operated to receive the first SIP invite message.

System Embodiment 11

The communications system of system embodiment 10, wherein the default flow table entry has a lower priority than the first flow table entry.

System Embodiment 12

The communications system of system embodiment 11, wherein the matching criteria of the default flow table entry is a destination address in a received packet header matching the shared SBC IP ingress address and a destination port number that matches a specified port number, e.g. a port number used for SIP signaling messages.

System Embodiment 13

The communications system of system embodiment 1, wherein the first processor is configured to: initiate installation of a third flow table entry into said SDN switches, said third flow table entry controlling SDN switches into which the third flow table entry is installed to replace a source IP address, e.g., in the source field of the packet header, in received packets which satisfy matching criteria of the third flow table entry with the shared SBC IP ingress address and to route received packets satisfying the matching criteria of the third flow table entry based on a destination address and port number included in the packet header of the received packet satisfying the matching criteria of the third flow table entry, said initiate installation of the third flow table occurring prior to the SBC cluster leader receiving the first SIP invite message.

System Embodiment 14

The method of system embodiment 13, wherein the matching criteria of the third flow table entry includes a source IP address in the received packet matching the first SBC IP ingress address.

System Embodiment 15

The method of system embodiment 14, wherein third flow table entry has a lower priority than the first flow table entry.

System Embodiment 16

The communications system of system embodiment 15, wherein the priority of the flow table entry controls precedence of flow table entry when the matching criteria of multiple flow entries are satisfied by a received packet and wherein the SDN switch performs only the actions required by the matching table entry with the highest priority.

System Embodiment 17

The communications system of system embodiment 1, wherein: each of the SBCs of the cluster includes a processor that asynchronously generates session transaction load state information on a recurring basis reflecting its current session transaction load state; and said SBC cluster leader includes a receiver that receives on a recurring basis the generated session transaction load state information from each of the client SBCs; said SBC cluster leader including a memory in which session transaction load information on each of the SBCs of the cluster of SBCs is stored.

System Embodiment 18

The communications system of system embodiment 15 wherein said SBC cluster leader is further controlled by said first processor to assign responsibility for processing the first SIP Invite message to the first SBC based on the session transaction load state information stored in said memory.

System Embodiment 19

The communications system of system embodiment 17 wherein said SBC cluster leader is further controlled by said first processor to assign responsibility for processing received SIP Invite messages based on session transaction load state information generated by the SBCs of the cluster.

System Embodiment 20

The communications system of system embodiment 1 wherein said SBC cluster leader is further controlled by said first processor to assign responsibility for processing received SIP Invite messages amongst said SBCs of the cluster using a round robin distribution method and without basing said assignment on the SBCs transactional load state.

List of Set of Exemplary Numbered Computer Readable Medium Embodiments

Computer Readable Medium Embodiment 1

A non-transitory computer readable medium including a set of computer executable instructions which when executed by a processor of a session border controller cause the session border controller to perform the steps of: receiving a first SIP invite message and assign responsibility for processing the first SIP invite message to a first SBC in a plurality of SBCs, said plurality of SBCs being a cluster of SBCs, said SBC cluster leader being the leader of the cluster of SBCs, said first SIP invite message including a first SIP packet header including a first source IP address; and initiating installation of a first flow table entry into SDN switches used to control packet routing in an SDN network, said SDN switches including at least a first SDN switch, said first flow table entry controlling SDN switches into which the first flow table entry, e.g., row in the SDN routing table, is installed to replace a destination IP address, e.g., in the IP destination address field of the packet header, in received packets which satisfy matching criteria of the first flow table entry with a first SBC IP ingress address of the first SBC and to the route received packets matching the criteria of the first flow table entry based on the first SBC IP ingress address.

Computer Readable Medium Embodiment 2

The computer readable medium embodiment of computer readable medium embodiment 1, wherein said matching criteria of the first flow table entry include: a packet header source IP address which matches the first source IP address and a packet header destination IP address which matches the shared SBC IP ingress address.

The techniques of various embodiments may be implemented using software, hardware and/or a combination of software and hardware. Various embodiments are directed to apparatus, e.g., session border controllers, controllers including SDN controllers, switches including SDN switches, telecommunications systems, network nodes and/or network equipment devices. Various embodiments are also directed to methods, e.g., method of controlling and/or operating devices, session border controllers, user devices, OpenFlow switches, SDN switches, SDN controller, realtime communications entities, telecommunications systems, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., session border controller, switch or controller, including a processor configured to implement one, multiple or all of the steps of one or more methods of the invention.

In some embodiments, the processor or processors, e.g., CPUs, of one or more devices, e.g., communications nodes such as session border controllers are configured to perform the steps of the methods described as being performed by the communications nodes, e.g., session border controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a session border controller, with a processor which includes a component corresponding to each of the steps of the various described methods performed by the device in which the processor is included. In some but not all embodiments a device, e.g., communications node such as a session border controller, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of assigning responsibility for processing of Session Initiation Protocol (SIP) messages addressed to a shared Session Border Controller (SBC) IP ingress address, the method comprising:
   operating a SBC cluster leader to receive a first SIP invite message and assign responsibility for processing the first SIP invite message to a first SBC in a plurality of SBCs, said plurality of SBCs being a cluster of SBCs, said SBC cluster leader being the leader of the cluster of SBCs, said first SIP invite message including a first SIP packet header including a first source IP address; and
   operating the first SBC to initiate installation of a first flow table entry into Software Defined Networking (SDN) switches used to control packet routing in an SDN network, said SDN switches including at least a first SDN switch, said first flow table entry controlling SDN switches into which the first flow table entry is installed to replace a destination IP address in received packets which satisfy matching criteria of the first flow table entry with a first SBC IP ingress address of the first SBC and to route received packets matching the criteria of the first flow table entry based on the first SBC IP ingress address.

2. The method of claim 1, wherein said matching criteria of the first flow table entry includes:
   a packet header source IP address which matches the first source IP address and a packet header destination IP address which matches the shared SBC IP ingress address.

3. The method of claim 1, further comprising:
   operating the SBC cluster leader to notify the first SBC of responsibility for handling packets sent from the first source IP address and addressed to the shared SBC IP ingress address.

4. The method of claim 3, wherein operating the SBC cluster leader to notify the first SBC of responsibility for handling packets sent from the first source IP address and addressed to the shared SBC IP ingress address includes:
   forwarding the first SIP invite message to the first SBC.

5. The method of claim 4, further comprising:
   operating the SBC cluster leader to receive a second SIP invite message and assign responsibility for processing the second SIP invite message to a second SBC in the plurality of SBCs, said second SIP invite message including a second SIP packet header including a second source IP address which is different from said first source IP address; and operating the SBC cluster leader to send a notification to the second SBC of responsibility for handling packets sent from the second source IP address and addressed to the shared SBC IP ingress address.

6. The method of claim 5, further comprising:
operating the second SBC to receive the notification of responsibility for handling packets sent from the second source IP address and addressed to the shared SBC IP ingress address;
operating the second SBC to respond to the received notification of responsibility for handling packets sent from the second source IP address and addressed to the shared SBC ingress address by:
i) sending an acknowledgement to said SBC cluster leader, and
ii) initiating installation of a second flow table entry into SDN switches used to control packet routing in the SDN network, said second flow table entry controlling SDN switches into which the second flow table entry is installed to replace a destination IP address in received packets which satisfy matching criteria of the second flow table entry with a second SBC IP ingress address of the second SBC and to route received packets satisfying the matching criteria of the second flow table entry based on the second SBC IP ingress address.

7. The method of claim 6, wherein said matching criteria of the second flow table entry includes:
a packet header source IP address which matches the second source IP address and a packet header destination IP address which matches the shared SBC IP ingress address.

8. The method of claim 1, further comprising:
prior to operating the SBC cluster leader to receive the first SIP invite message, operating the SBC cluster leader to initiate installation of a default flow table entry that controls SDN switches that include the default flow table entry to replace a destination IP address in received packets which satisfy matching criteria of the default flow table entry with an IP ingress address of the SBC cluster leader and to route received packets satisfying the matching criteria of the default flow table entry based on the IP ingress address of the SBC cluster leader.

9. The method of claim 8, wherein the default flow table entry has a lower priority than the first flow table entry.

10. The method of claim 9, wherein the matching criteria of the default flow table entry is an IP destination address in a received packet header matching the shared SBC IP ingress address and a destination port number that matches a specified port number.

11. The method of claim 1, further comprising:
prior to the SBC cluster leader receiving the first SIP invite message, initiating installation of a third flow table entry into said SDN switches, said third flow table entry controlling SDN switches into which the third flow table entry is installed to replace a source IP address in received packets which satisfy matching criteria of the third flow table entry with the shared SBC IP ingress address and to route received packets satisfying the matching criteria of the third flow table entry based on a destination address and port number included in the packet header of the received packet satisfying the matching criteria of the third flow table entry.

12. The method of claim 11, wherein the matching criteria of the third flow table entry includes a source IP address in the received packet matching the first SBC IP ingress address.

13. A communications system comprising:
a Session Border Controller (SBC) cluster leader including a first processor configured to control the operation of the SBC cluster leader to receive a first SIP invite message and assign responsibility for processing the first SIP invite message to a first SBC in a plurality of SBCs, said plurality of SBCs being a cluster of SBCs, said SBC cluster leader being the leader of the cluster of SBCs, said first SIP invite message including a first SIP packet header including a first source IP address; and
the first SBC including a second processor configured to control the operation of the first SBC to initiate installation of a first flow table entry into Software Defined Networking (SDN) switches used to control packet routing in an SDN network, said SDN switches including at least a first SDN switch, said first flow table entry controlling SDN switches into which the first flow table entry is installed to replace a destination IP address in received packets which satisfy matching criteria of the first flow table entry with a first SBC IP ingress address of the first SBC and to route received packets matching the criteria of the first flow table entry based on the first SBC IP ingress address.

14. The communications system of claim 13, wherein said matching criteria of the first flow table entry includes:
a packet header source IP address which matches the first source IP address and a packet header destination IP address which matches a shared SBC IP ingress address.

15. The communications system of claim 13,
wherein said first processor is further configured to control the operation of the SBC cluster leader to notify the first SBC of responsibility for handling packets sent from the first source IP address and addressed to the shared SBC IP ingress address.

16. The communications system of claim 15, wherein said control the operation of the SBC cluster leader to notify the first SBC of responsibility for handling packets sent from the first source IP address and addressed to the shared SBC IP ingress address includes the SBC cluster leader forwarding the first SIP invite message to the first SBC.

17. The communications system of claim 16, wherein said first processor is further configured to control the operation of the SBC cluster leader to:
receive a second SIP invite message and assign responsibility for processing the second SIP invite message to a second SBC in the plurality of SBCs, said second SIP invite message including a second SIP packet header including a second source IP address which is different from said first source IP address; and
send a notification to the second SBC of responsibility for handling packets sent from the second source IP address and addressed to the shared SBC IP ingress address.

18. The communications system of claim 13, wherein said first processor is further configured to control the operation of the SBC cluster leader to:
to initiate installation of a default flow table entry that controls SDN switches that include the default flow table entry to replace a destination IP address in received packets which satisfy matching criteria of the default flow table entry with an ingress address of the SBC cluster leader and to route received packets satisfying the matching criteria of the default flow table entry based on the ingress address of the SBC cluster leader prior to the SBC cluster leader being operated to receive the first SIP invite message.

19. The communications system of claim 18, wherein the matching criteria of the default flow table entry is a destination address in a received packet header matching the shared SBC IP ingress address and a destination port number that matches a specified port number.

20. A non-transitory computer readable medium including a set of computer executable instructions which when executed by a processor of a session border controller cluster leader cause the session border controller cluster leader to perform the steps of:

receiving a first SIP invite message and assigning responsibility for processing the first SIP invite message to a first Session Border Controller (SBC) in a plurality of SBCs, said plurality of SBCs being a cluster of SBCs, said SBC cluster leader being the leader of the cluster of SBCs, said first SIP invite message including a first SIP packet header including a first source IP address; and initiating installation of a first flow table entry into Software Defined Networking (SDN) switches used to control packet routing in an SDN network, said SDN switches including at least a first SDN switch, said first flow table entry controlling SDN switches into which the first flow table entry is installed to replace a destination IP address in the IP destination address field of a packet header in received packets which satisfy matching criteria of the first flow table entry with a first SBC IP ingress address of the first SBC and to route received packets matching the criteria of the first flow table entry based on the first SBC IP ingress address.

\* \* \* \* \*